Oct. 12, 1965  J. T. EVANS ETAL  3,211,896

AUTOMATIC CONTROL APPARATUS

Filed May 14, 1962  14 Sheets-Sheet 1

INVENTORS
JOHN T. EVANS
GEORGE B. LUKENS, II
BY
*Irving Kayton*
ATTORNEY

FIG. 4E
| A | B | C D | $G_N$ | $G_{N+1}$ | $H_N$ | $H_{N+1}$ |
|---|---|---|---|---|---|---|
| 0 | 0 | PULSE ABSENT | 0 / 1 | 0 / 1 | 1 / 0 | 1 / 0 |
| 0 | 1 | | 0 / 1 | 0 / 1 | 1 / 0 | 1 / 0 |
| 1 | 0 | | 0 / 1 | 0 / 1 | 1 / 0 | 1 / 0 |
| 1 | 1 | | 0 / 1 | 0 / 1 | 1 / 0 | 1 / 0 |
| (NOT ALLOWED) 0 | 0 | PULSE PRESENT | 0 / 1 | 0 / 1 | — | — |
| 0 | 1 | | 0 / 1 | 1 / 1 | 1 / 0 | 0 / 0 |
| 1 | 0 | | 0 / 1 | 0 / 0 | 1 / 0 | 1 / 1 |
| 1 | 1 | | 0 / 1 | 0 / 1 | 1 / 0 | 1 / 0 |
FIG. 4F
| | E | F | G | H |
|---|---|---|---|---|
| NORMAL STATE FOR OPERATION WITH TRIGGER INPUTS | 0 | 0 | NO CHANGE | |
| ELECTRONIC SET TO 0 STATE | 0 | 1 | 0 | 1 |
| ELECTRONIC SET TO 1 STATE | 1 | 0 | 1 | 0 |
| HOLDS BOTH OUTPUTS AT 0 LEVELS | 1 | 1 | 0 | 0 |
FIG. 4B
| A | B | (A+B) | $\overline{(A+B)}$ |
|---|---|---|---|
| 0 | 0 | 0 | 1 |
| 0 | 1 | 1 | 0 |
| 1 | 0 | 1 | 0 |
| 1 | 1 | 1 | 0 |
FIG. 4G
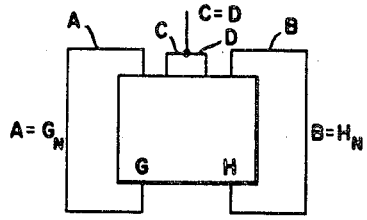
FIG. 4D
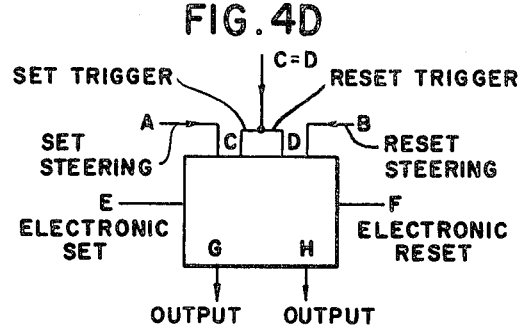
FIG. 4A
A, B → $C = \overline{(A+B)}$
FIG. 4C
A → $B = \overline{A}$
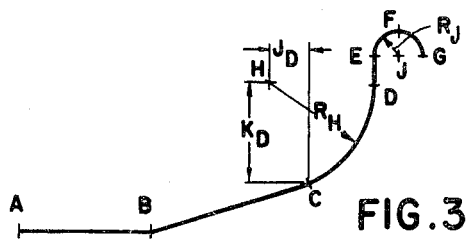
FIG. 3

| INPUTS | | | | | | OUTPUTS | | | |
|---|---|---|---|---|---|---|---|---|---|
| E | F | C | D | A | B | $G_N$ | $G_{N+1}$ | $H_N$ | $H_{N+1}$ |
| 0 | 1 | PULSE MAY BE PRESENT OR ABSENT | | MAY BE EITHER 0 OR 1 | | 0 | 0 | 1 | 1 |
|   |   |   |   |   |   | 1 | 0 | 0 | 1 |
| 1 | 0 |   |   |   |   | 0 | 1 | 1 | 0 |
|   |   |   |   |   |   | 1 | 1 | 0 | 0 |
| 1 | 1 |   |   |   |   | 0 | 0 | 1 | 0 |
|   |   |   |   |   |   | 1 | 0 | 0 | 0 |
| 0 | 0 | PULSE ABSENT | PULSE ABSENT | 0 | 0 | 0 | 0 | 1 | 1 |
|   |   |   |   |   |   | 1 | 1 | 0 | 0 |
| 0 | 0 |   |   | 0 | 1 | 0 | 0 | 1 | 1 |
|   |   |   |   |   |   | 1 | 1 | 0 | 0 |
| 0 | 0 |   |   | 1 | 0 | 0 | 0 | 1 | 1 |
|   |   |   |   |   |   | 1 | 1 | 0 | 0 |
| 0 | 0 |   |   | 1 | 1 | 0 | 0 | 1 | 1 |
|   |   |   |   |   |   | 1 | 1 | 0 | 0 |
| 0 | 0 | PULSE ABSENT | PULSE PRESENT | 0 | 0 | 0 | 0 | 1 | 1 |
|   |   |   |   |   |   | 1 | 0 | 0 | 1 |
| 0 | 0 |   |   | 0 | 1 | 0 | 0 | 1 | 0 |
|   |   |   |   |   |   | 1 | 1 | 0 | 0 |
| 0 | 0 |   |   | 1 | 0 | 0 | 0 | 1 | 1 |
|   |   |   |   |   |   | 1 | 0 | 0 | 1 |
| 0 | 0 |   |   | 1 | 1 | 0 | 0 | 1 | 1 |
|   |   |   |   |   |   | 1 | 1 | 0 | 0 |
| 0 | 0 | PULSE PRESENT | PULSE ABSENT | 0 | 0 | 0 | 1 | 1 | 0 |
|   |   |   |   |   |   | 1 | 1 | 0 | 0 |
| 0 | 0 |   |   | 0 | 1 | 0 | 1 | 1 | 0 |
|   |   |   |   |   |   | 1 | 1 | 0 | 0 |
| 0 | 0 |   |   | 1 | 0 | 0 | 0 | 1 | 1 |
|   |   |   |   |   |   | 1 | 1 | 0 | 0 |
| 0 | 0 |   |   | 1 | 1 | 0 | 0 | 1 | 1 |
|   |   |   |   |   |   | 1 | 1 | 0 | 0 |
| 0 | 0 | PULSE PRESENT | PULSE PRESENT | 0 0 NOT ALLOWED | | 0 | — | 1 | — |
|   |   |   |   |   |   | 1 | — | 0 | — |
| 0 | 0 |   |   | 0 | 1 | 0 | 1 | 1 | 0 |
|   |   |   |   |   |   | 1 | 1 | 0 | 0 |
| 0 | 0 |   |   | 1 | 0 | 0 | 0 | 1 | 1 |
|   |   |   |   |   |   | 1 | 0 | 0 | 1 |
| 0 | 0 |   |   | 1 | 1 | 0 | 0 | 1 | 1 |
|   |   |   |   |   |   | 1 | 1 | 0 | 0 |

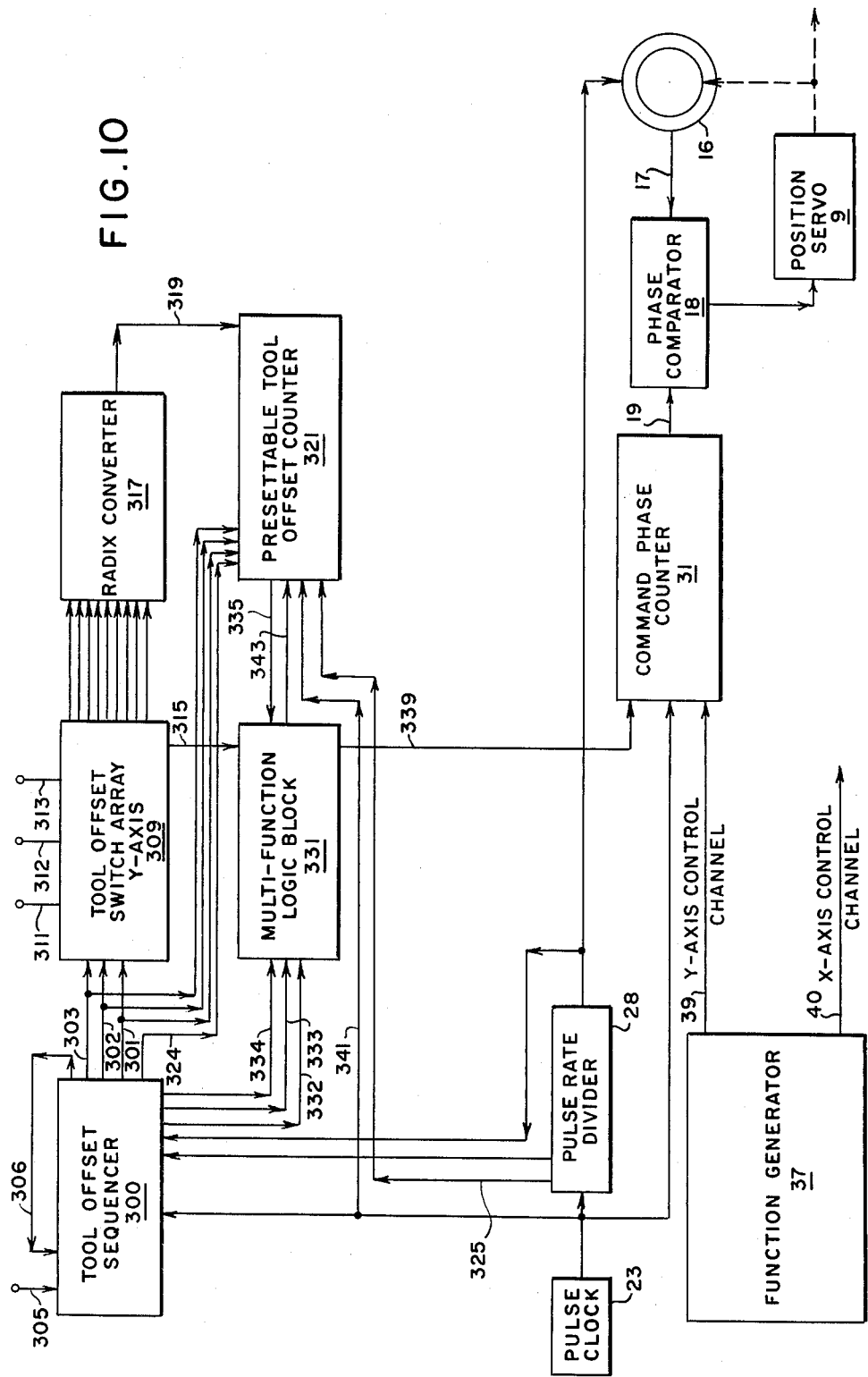

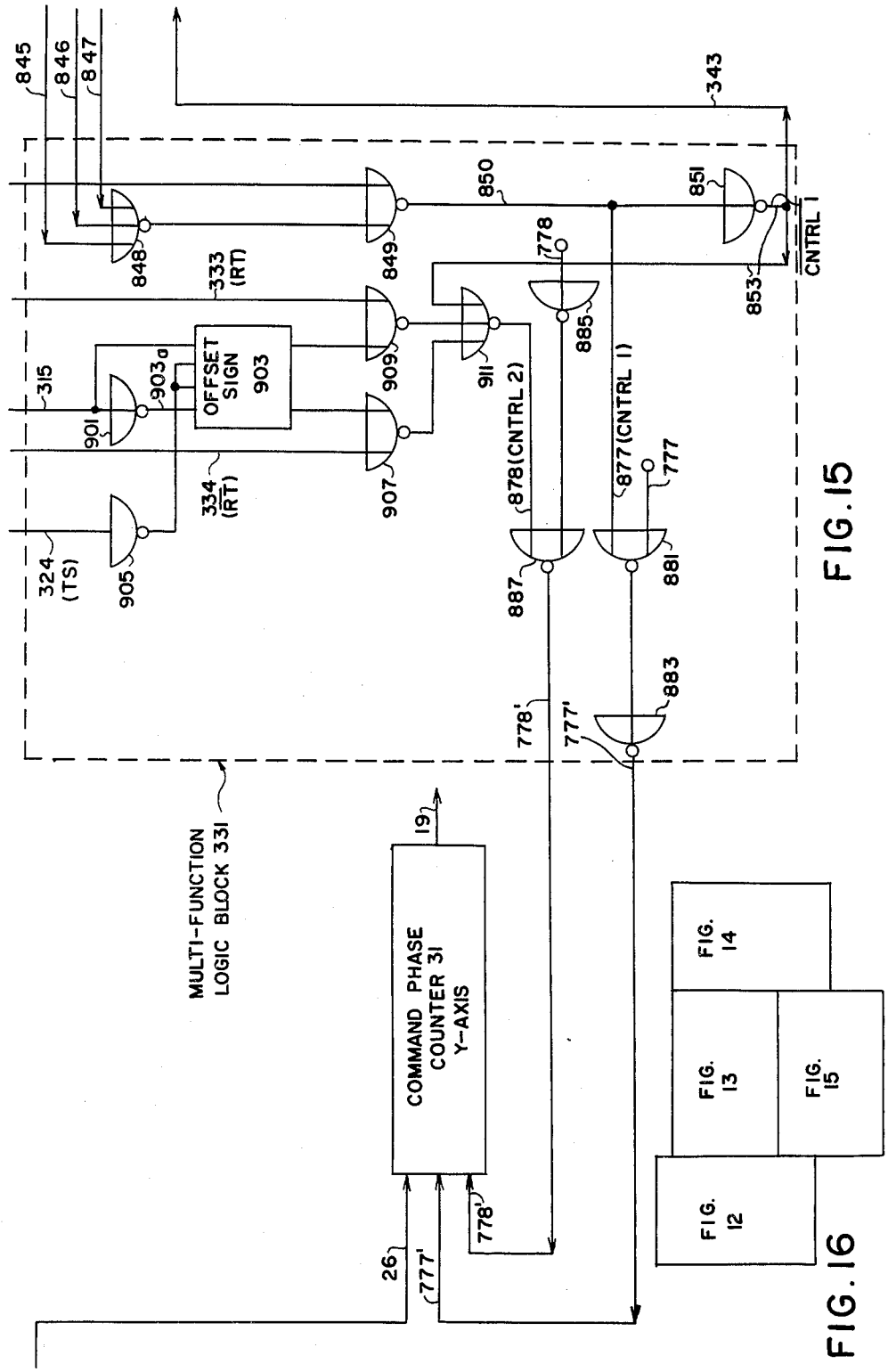

3,211,896
AUTOMATIC CONTROL APPARATUS
John T. Evans and George B. Lukens II, Waynesboro,
Va., assignors to General Electric Company, a corporation of New York
Filed May 14, 1962, Ser. No. 194,625
15 Claims. (Cl. 235—151)

This invention relates to numerically controlled machine tool systems wherein a work product is to be operated upon in order to obtain a complicated shape, or is to be subjected to a predetermined sequence of operations with a cutting tool, in accordance with numerically programmed instructions. It particularly relates to means for automatically compensating for cutting tool size and shape variations in multiple-tool systems, and for variants in the position and angle of the cutting tool for single tool systems operative in a plurality of cutting modes.

In the copending patent application entitled "Automatic Control Apparatus," Serial No. 178,144, now Patent No. 3,123,657 filed March 7, 1962, of Stephen C. Clark, Jr., and John E. Jones, there is disclosed, as a preferred embodiment, a numerical contouring control system incorporating one type of tool offset correction system. This tool offset correction system specifically makes allowance for the thickness of the cut or kerf which results from the finite thickness of the cutting tool used in the contouring operation. In such a system, since it is the peripheral arcuate edge of the cutting tool, rather than its center, which must always be maintained tangent to the required contouring path of the work piece, it is necessary to program into the input numerical punched tape a path which brings the cutting edge in tangency with the desired path contour. Therefore, it is ordinarily necessary to program the offset path which the center of the cutting element must follow in order for its arcuate edge to be maintained tangent to the required contour. In accordance with the principles of the invention in the above mentioned copending application, the tool offset or kerf correction is provided and automatically introduced into the contouring control system without the need for additional complex computation and programming.

The instant invention concerns itself with another type of tool offset correction, wherein it may be assumed that provision has already been made for kerf correction. Thus, assuming that either programming or the principles of the invention of the above identified patent application have been applied such that the contoured path is properly cut to compensate for the kerf of the cut, the need for an additional and different type of tool offset correction may be required and is provided in accordance with the principles of the instant invention.

In certain numerical contouring control systems (and also in numerical positioning control systems) it is often the case that a multiplicity of different cutting tools is utilized for different portions of the contoured path (or portions of the discrete positioning process). Thus, for example, in an engine lathe utilizing a multiple tool turret post there may be from two to eight cutting tools radially mounted upon, and extending from, the rotatable turret tool post head. The programmed contour path may require several sequential cutting tool changes for successive cuts in the contoured path. Thus, before the total shaped contour is completed in the work piece, some or all of the cutting tools may be utilized, in accordance with the program. Since only one cutting tool may be used at a time during each cut, and since the several tools often have different lengths as well as cutting edge angles (i.e., each cutting edge may be skewed at a different angle and have a different geometry than that of the others), it is necessary to insure that every time the turret is rotated to place the next programmed tool into position, the cutting edge of that tool is located at the same reference location as the preceding one so that the contoured cut may be properly performed. In short, the tool offset correction required for the multiple-tool numerical control system under discussion is one which comprehends a specified correction for each tool which brings its cutting edge into precise registration with a common reference point if that particular cutting tool would not ordinarily register with the reference point, because of size or cutting angle variation.

The tool offset correction required, therefore, is one which may have a component of correction in each of the plurality of coordinates through which the contour may be cut. For the purpose of simplicity of narration, the preferred embodiment to be discussed is directed to an engine lathe operative in two orthogonal directions to obtain the desired contour. Accordingly, the tool offset corrections for this multiple-tool preferred embodiment provide tool offset corrections in those two orthogonal coordinates. It is to be understood, however, that any numerically controlled machine tool utilizing multiple tools may benefit from the application of the principles of the invention, e.g., horizontal boring and milling machines with multiple tool selection are appropriate subjects. Indeed, the number of tools for which corrections may be provided is substantially limitless. A machine having literally two hundred or more tools for selection may be handled in exactly the same way and in accordance with the same principles of the invention as a system utilizing solely two cutting tools. Furthermore, a machine tool utilizing solely a single cutting tool may also benefit from the application of the principles of the invention if it is a multi-position device such as a single tool engine lathe having both turning and facing positions with the same cutting tool insert.

The instant tool offset system permits the engine lathe operator to manually set a multiplicity of sets of switches, one set for each machine tool requiring offset correction, to compensate for the differences in the position of the cutting edge of each of the multiplicity of tools in the multiple tool turret post. Each time the turret is rotated to a different tool, the position commanded by the numerical contouring control system for the cutting tool is modified or offset by the amount previously set for that tool.

The general organization of the automatic numerical contouring control system which constitutes the preferred environment for the tool offset correction system in accordance with the principles of the invention, comprehends that the numerical digital control portion of the system controls output servomechanisms which drive the cutting element (or the work piece relative to the element, or both the work piece and the element). Thus, in a control system for two-coordinate motion, the digital control portion generates command signals representative of the path length and the cutting tool translational velocity to be observed over that path length, for both orthogonal coordinates of the plane. In this way, the path length and velocity commands for the X-coordinate actuate the servo loop driving the cutting element in the X direction, and a similar servo loop for the Y direction utilizes path lengths and velocity commands for the Y direction.

An important function of the digital control portion of the contouring control system, therefore, is to generate pulse trains, for application to the servo systems, which are representative of the desired X and Y coordinate velocities. This is done by initially generating a pulse rate directly commensurate with the resultant velocity programmed into the input tape and required for the machine tool movement for that cut. The resultant pulse rate is then resolved into X and Y coordinate pulse rates so that the X and Y servomechanisms responsive thereto move the cutting element in precisely the correct angular direction. Since the pulse rate is directly commensurate with the resultant velocity of the machine tool, it follows that each pulse represents an incremental distance of machine tool motion. In the preferred embodiment, herein subsequently to be described, the incremental distance represented by each pulse is .0001 of an inch. If the control system generates 100,000 pulses, for the purpose of determining a path length, then the total motion that is traversed by the cutting tool relative to the work piece is 100,000 times .0001, or ten inches.

Implicit in the discussion thus far presented, and explicit in the discussion to follow, the general organization of the automatic control system within which functions the tool offset correction system in accordance with the principles of the invention, comprehends that the path length and velocity commands of the control system are represented in the servo loop by the phase and rate of change of phase, respectively, of the pulse train applied to the servomechanism which in turn is coupled to and drives, the machine tool. A sensing mechanism observes the position of the machine tool as the machine tool responds to the command signals, and generates a pulse train whose phase relative to a reference is representative of the present actual position of the machine tool. The phase of the command position signal is compared with the phase of the actual position signal, so that an error signal directly proportional to the phase difference may be generated to provide feedback control in the feedback loop of the servomechanism. The magnitude of the error signal, and its sense or polarity (determined by whether the phase of the command signal leads or lags that of the actual position signal) causes the machine tool to move in such direction as to tend to reduce the magnitude of the error signal.

The same basic pulse rate and phase relative to a reference is provided for the command signal as is provided for the machine tool feedback signal so that, with a commanded velocity of zero and an actual tool velocity of zero, two equal frequency and in-phase pulses rates are applied to the comparison means. This results in a zero difference or error signal, and nothing happens. When the commanded velocity is other than zero, means is provided for continuously changing or modulating the phase of the basic pulse command signal relative to the reference. Comparison of this phase modulated command pulse train with the phase of the feedback signal of the machine tool which is still at rest, will indicate a phase difference increasing in magnitude.

The means utilized for phase modulating the pulse train proportional to commanded velocity is a pulse counter often termed a command phase counter. The basic unmodulated pulse train is applied to the counter as an input; the output is a pulse train having a phase angle which is either leading or lagging, dependent upon whether or not and in what manner control pulses or signals are utilized for modulating the basic pulse train as it is counted by the command phase counter. Thus, the output of the command phase counter, which is applied to the servomechanism loop for comparison with the actual position signals determined by the position of the machine tool itself, has a phase angle uniquely determined by all of the command signals applied to the command phase counter during the preceding operations of the contouring control system and the command phase counter. It is of importance to note that the phase modulated output of the command phase counter is a determinant not only of the velocity of motion of the cutting element, but also of the instantaneous position of the cutting element throughout the entire contouring operation. Control of the command phase counter thus controls both the velocity and position of the machine tool cutting element.

The multiple tool, or single tool multiple position, offset correction system, in accordance with the principles of the invention, accommodates itself integrally with the contouring control system at the command phase counter heretofore mentioned. Thus, when the input numerical program calls for a particular one of the multiplicity of cutting tools at the beginning of a programmed contour or between successive cuts of the contour, command pulses representative of the tool offset correction appropriate for that programmed tool are applied to the command phase counter. Phase modulation of the output of the counter is thereby provided which is commensurate with the required offset correction. The servomechanism for that coordinate thereby causes the cutting edge to move an amount equal to the required offset correction. Command signals may also be applied to the command phase counter for the other of the two orthogonal coordinates for offset correction in the second coordinate. Since each pulse is directly commensurate with an incremental distance of .0001 of an inch, the total number of tool offset correction command pulses applied to the command phase counter serves to appropriately move the cutting edge that specified offset correction distance.

The total number of offset correction command pulses to be applied to the command phase counters for the respective coordinates is determined by the lathe operator as numbers manually set into the previously mentioned multiplicity of sets of switches. Each set of switches serves to set up a digital number representative of the offset correction for the two coordinates for that specific cutting tool. When the switches are interrogated or sensed in the proper sequence, offset correction command signals are generated equal to the required offset correction, i.e., there is generated one pulse for each .0001 of an inch of offset correction set in the switch for that coordinate. Thus, when required by the program, the offset correction dimensions digitally set into the switches by the operator are called into play and algebraically added into the command phase counter to phase modulate the output of the counter in the required correction direction. After the offset correction has been completed, means is provided for recognizing completion of the correction, and the process is stopped, whereupon the succeeding cut may be performed.

It is of basic importance to recognize that once the offset correction has been introduced into the system, and the cutting edge is moved to the reference point, the phase modulated output of the command phase counter includes the phase modulation introduced as a consequence of the offset correction for all time to come, unless subsequently modified. Thus, for all succeeding contouring operations wherein the command phase counter is additionally phase modulated in accordance with the velocity and path requirements, the added phase modulation for contouring is superposed upon the offset correction phase modulation. This means that looking at the output of the command phase counter can provide no indication as to whether or not an offset correction has been introduced, and no indication as to the magnitude of the offset correction.

Recognition of this algebraic superposition of offset correction and contouring phase modulation in the system is an important aspect of the invention. Since, during automatic operation, there is no way of ascertaining whether or not a particular offset correction has been introduced, means must be provided to record the fact and the magnitude of the offset correction. Because the offset correction functions relative to the contouring on the basis of a phase superposition principle, it is possible (and mandatory) with this stored information to remove the superposed offset correction, immediately prior to introducing a new offset correction for the next programmed machine tool.

Very broadly, then, the arrangement of the offset correction system, and its sequence of operation, in accordance with the principles of the invention, is as follows:

(1) A tool offset correction which has been set in digital switches by an operator is preset into a count-down counter, hereinafter referred to as the offset counter.

(2) This offset is then translated into a phase change in the output of the command phase counter, so that the output phase modulated signal is altered to include the offset correction. During this translation process, the offset counter counts down to decimal zero, whereupon no further offset phase modulation is provided.

(3) The very same offset correction that was preset into the offset counter in step (1) is once again preset into the offset counter after it has counted down to decimal zero, and stored for future use.

(4) Upon receipt of a signal from the programmed instructions for a different offset (as required by another programmed tool) the preceding offset stored in the offset counter by virtue of step (3) is once again used to phase modulate the output of the command phase counter, but in an opposite direction or algebraic sense from the modulation applied in step (2). In this way, the offset correction introduced by step (2) is completely removed from the system.

(5) The new offset correction (for the newly programmed tool) is then preset into the offset counter, as was the preceding offset correction specified in step (1), and the entire process is repeated.

It is known in the prior art to provide tool offset corrections in various systems by utilizing differential synchros. Thus, when it was required to change the offset corrections as the tools were changed, separate synchros for each tool were switched in and out with relays. However, this arrangement of the prior art requires a system of much larger size and greater cost than the system in accordance with the principles of the invention. Furthermore, the switching of the synchros in a phase modulated digital contouring control system is subject to the inherent danger that errors may be introduced into the system due to transients consequent upon the switching of the synchros. A major advantage of the system in accordance with the principles of the invention over this prior art system resides in the fact that the offset correction is provided completely digitally in a positive logic switching control arrangement.

The novel features believed to be characteristics of the invention are set forth with particularity in the appended claims. The invention itself, however, both as to its organization and method of operation, together with further objects and advantages thereof, may best be understood by reference to the following description taken in connection with the accompanying drawings.

In the drawings:

FIG. 3 is a curve representative of an illustrative shape that may be automatically cut in a work piece under control of the automatic apparatus of the invention;

FIGS. 4A through 4H represent the basic logic blocks, and their related truth tables, used in the logic circuits of the succeeding figures;

FIG. 10 is a general block diagram of the tool offset correction system in accordance with the principles of the invention;

Figure 12:
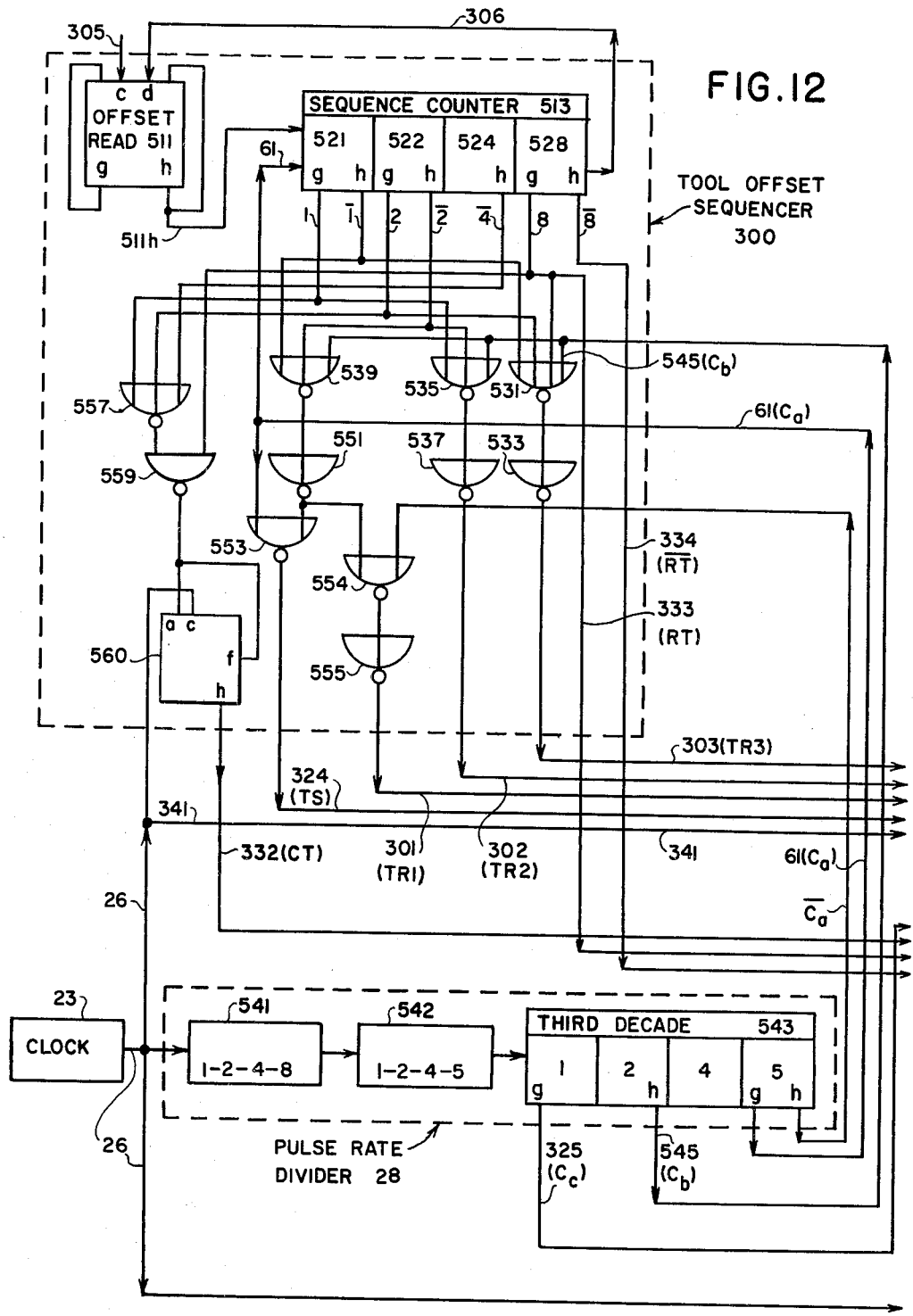
Figure 17:
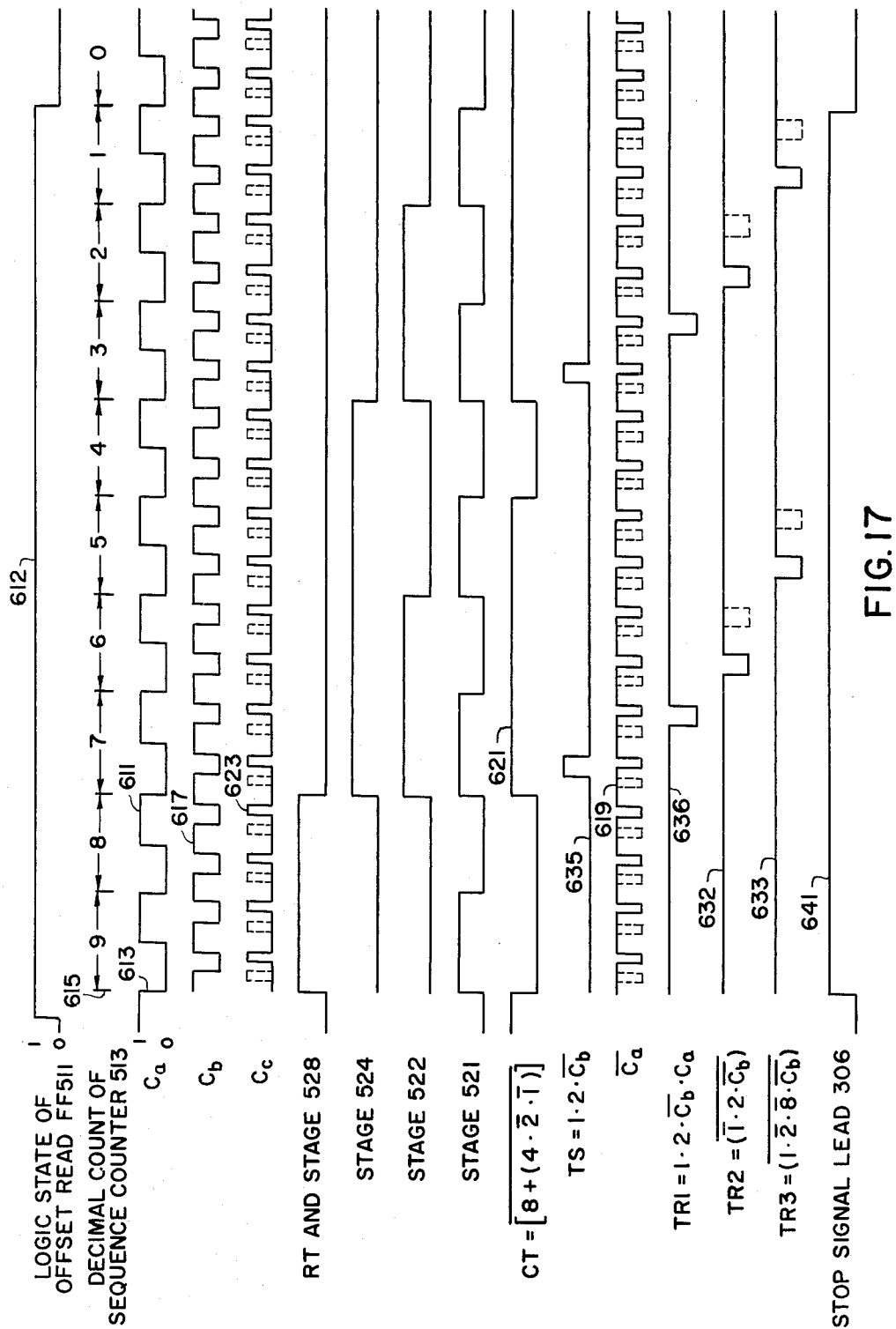

FIGS. 12 through 15, taken together as shown in FIG. 16, present the detailed logic circuit of the tool offset correction system in accordance with the principles of the invention, presented here by way of example for purposes of illustration; and FIG. 17 presents several logic state waveforms defining the operation of a portion of the logic circuit shown in FIG. 12.

THE NATURE OF THE MULTIPLE TOOL OFFSET CORRECTION PROBLEM

Figure 1A:
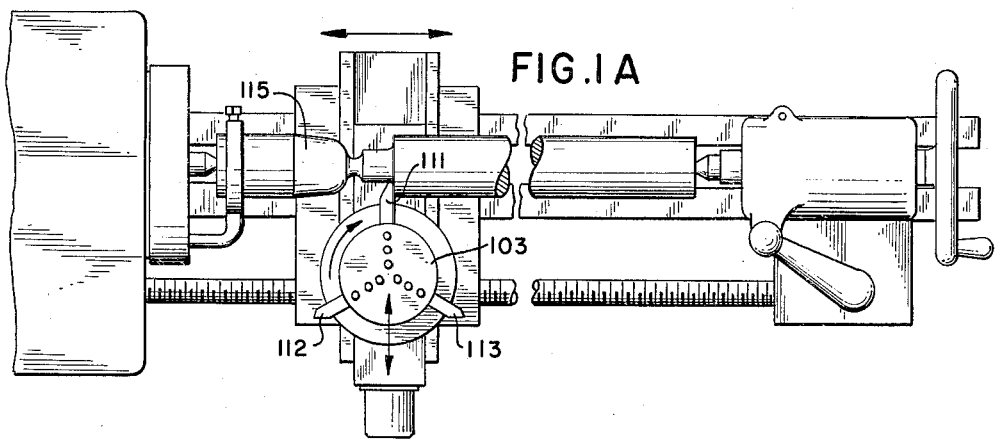
FIG. 1A is a plan view of an engine lathe with a multiple tool turret post to be controlled by a numerical contouring control system incorporating the tool offset correction system of the invention.

In order to properly understand how the automatic offset correction is provided in the multiple tool engine lathe numerical contouring control system to be described, it is essential to understand the specific reasons why a tool offset correction is needed in the first place. In FIG. 1A, there is shown a plan view of an engine lathe having a turret tool post 103 in which are mounted three cutting tools 111, 112 and 113. In the preferred embodiment to be discussed, the turret holds three conventional cutters utilizing standard carbide wafers. However, the turret may well mount six or eight cutters.

The engine lathe is a typical lathe, having a head and tail stock and carriage. The spindle which holds the work may typically rotate at a rate of twenty-two to a thousand revolutions per minute. The turret tool post is mounted such that it may be moved longitudinally along the axis of the work piece 115, that is, along the longitudinally extending line between the head and tail stocks. Simultaneously, cross-feed of tool post 103 may be provided in a direction transverse to this longitudinal axis. The longitudinal and cross-feed directions, therefore, constitute the two orthogonal components for the contouring control system. The tool post turret 103 has radially extending therefrom the three cutters 111, 112 and 113, each one of which may be rotated automatically under positive control into the cutting position. As shown in FIG. 1A, cutter 111 is in the cutting position. Work piece 115 shown mounted on the spindle of the lathe has already been partially contoured in accordance with a program.

Figure 1B:
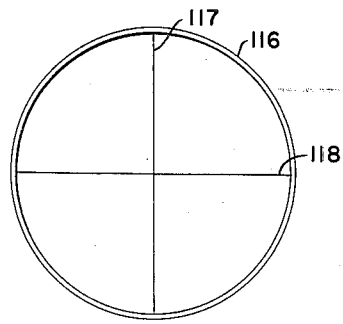
FIG. 1B is a cross-sectional representative view of the lathe operator's tool set-up telescope with cross-hairs.

In setting up the work and the operation for tool offset correction, the lathe operator utilizes a small telescope 116 (whose cross-section is represented in FIG. 1B) having an appropriate magnification factor such that the cutting edge may be readily brought into register with cross-hairs 117 and 118. Telescope 116 is sighted vertically downward in a region adjacent the cutting edge of the tool mounted upon the turret in the cutting position. The intersection of cross-hairs 117–118 of the telescope, under certain set-up conditions, may represent the reference point of the system. An absolute point may thereby be fixed for the numerical contouring control system.

Often, this reference is taken as the cutting edge or point of one of the cutting tools when in the cutting position.

Figure 1C:
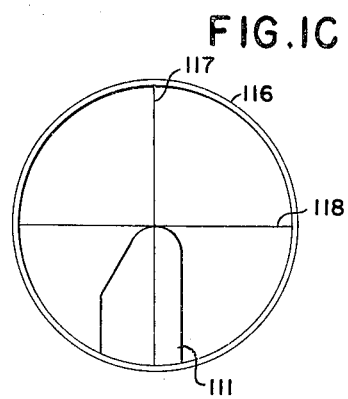
FIGS. 1C, 1D and 1E show the three tools mounted in the turret of FIG. 1A as viewed through the telescope of FIG. 1B, and illustrate the nature of the tool offset correction problem.
Figure 1D:
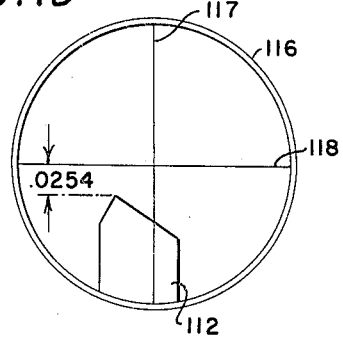
Figure 1E:
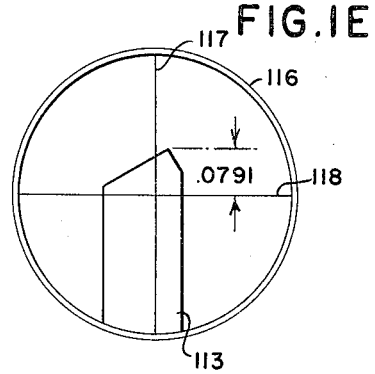

FIGS. 1C, 1D and 1E represent cutting tools 111, 112 and 113, respectively, as viewed through telescope 116 when each is rotated into cutting position. FIG. 1C shows the reference cutting tool 111 whose length and cutting edge geometry are disposed so as to bring it precisely in register with the intersection of cross-hairs 117–118. FIG. 1D shows cutting tool 112 which is not as long as that of FIG. 1C, and has a cutting edge geometry which is skewed to the left compared to tool 111 of FIG. 1C. Thus, for the tool of FIG. 1D, a tool offset correction is required in the cross-feed or Y coordinate direction (along cross-hair 117) of an amount equal to the spacing between the tip of the tool and longitudinal cross-hair 118. The skewed angle of the cutting tip necessitates an X direction or longitudinal coordinate correction (along cross-hair 118) equal to the small amount which the cutting point of the tool is offset from cross-hair 117. The convention adopted for the system is that the direction to the right along the longitudinal axis is positive, and the direction from the longitudinal axis to the tool post in the cross-feed direction is positive. Accordingly, a positive X correction and a negative Y offset correction is required in FIG. 1D. In FIG. 1E, the third tool 113 is shown. Tool 113 is longer than either of the other two, and is skewed in a sense opposite from that of FIG. 1D. Accordingly, for FIG. 1E, the offset correction required is a positive Y or cross-feed correction and a negative X or longitudinal axis correction.

The manner in which these corrections are provided in accordance with the principles of the invention will be presented hereinafter in detail. However, in order to fully comprehend the nature of the features and the means for providing automatic cutting element offset correction an explanation and proper understanding is required of the overall system and operation of the numerical contouring control system within which the multiple tool offset correction subsystem is included. Therefore, the discussion relating to FIGS. 2A through 9 is devoted to an explanation of the automatic numerical contouring control system operative for two coordinates; for an even more detailed description, reference may be had to the above-mentioned copending patent application of Clark and Jones wherein detailed logic circuitry is presented further amplifying the description of the block system diagrams of FIGS. 2A and 2B. Thereafter, a description relating to FIGS. 10 through 17 is presented, which first explains the tool offset correction system in general, and then provides a detailed description and explanation of that system in accordance with the principles of the invention.

NUMERICAL CONTOURING SYSTEM— IN GENERAL

Figure 2A:
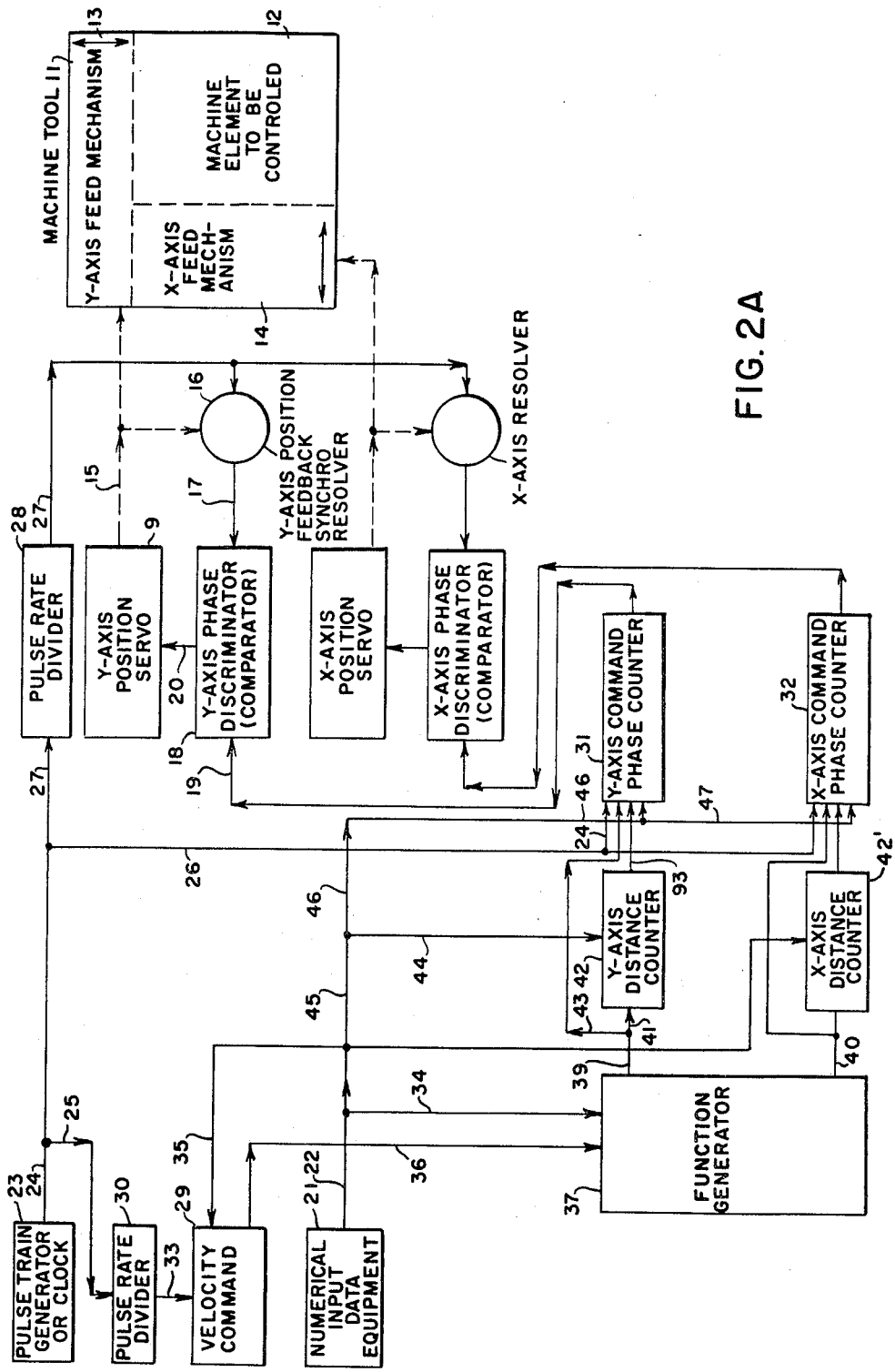
FIG. 2A is a general block diagram of a numerical contouring control system to which the tool offset correction system in accordance with the invention is applied as shown in FIGS. 10 through 17.

The numerical contouring control system, as represented in FIG. 2A, may be viewed as comprising three broad sections. The purpose of the entire system, of course, is to control, automatically, the machine tool 11 shown generally as a block at the right-hand side of the drawing, but which may be the engine lathe of FIG. 1A. Machine tool 11 comprises a machine element 12 (which may be one of the cutting tools 111, 112 or 113 of FIG. 1A) to be controlled by the contouring control section, the Y-axis feed mechanism 13, and the X-axis feed mechanism 14. Feed mechanisms 12 and 14 comprise appropriate drive shafts and gearing which actuate machine element 12 for motion along the two coordinates. It is to be understood, however, that the system may be utilized for controlling machine elements in additional coordinates.

There is a separate servo loop for each of the two linear coordinate feed mechanisms. The Y-axis servo loop and the X-axis servo loop are structurally independent of each other in their action in driving the feed mechanisms. Since the equipment throughout the system for the X coordinate is precisely the same as for the Y coordinate, solely the Y coordinate system will be described, except where a discussion of the equipment of both co-ordinates is required for clarification. The Y coordinate servo loop comprises a Y-axis position servo 9, including a D.C. amplifier driving a servo motor which by its output shaft 15 controls a feed motor control to actuate the Y-axis feed mechanism 13. Simultaneously, position servo shaft 15 drives the Y-axis position feed-back synchro resolver 16. The output lead 17 of position feedback resolver 16 provides an electrical representation of the position of machine elements 12 in the Y-coordinate since both feed mechanism 13 and resolver 16 are driven in common by the position servo 9.

Lead 17 is coupled into the Y-axis phase discriminator or comparator 18. The discriminator's function is to compare the actual position of cutting tool 12, in the Y-coordinate, as represented by the Y-axis position feed back resolver 16, on the one hand, with the commanded position from the control section. Thus, the phase of the command signal entering the Y-axis phase discriminator 18 from the left on lead 19 is compared with the phase of the actual feed back position signal which comes into discriminator 18 from resolver 16. The difference in the phase between the command signal and the feed back signal is commensurate with the difference between the commanded position and the actual position. This phase difference is utilized for generating an error signal which is then fed into the servo mechanism 9 on lead 20. Servo mechanism 9 drives the Y-axis feed mechanism in accordance with the instantaneous error signal. The servo mechanism loop, therefore, comprises the Y-axis position servo 9, the Y-axis position feed back synchro resolver 16 and the Y-axis phase discriminator 18. Discriminator 18 is also common to the control section now briefly to be outlined.

The input to the control section of the overall numerical contouring control system is the numerical input data equipment block 21 which accepts numerical command data. Input equipment 21 may be a punched tape, punched card, or magnetic tape, digital input sub-system. For the purposes of the numerical contouring control system under discussion, punched tape has been found to be particularly advantageous. Numerical input data equipment 21 reads the instructions and addresses on the input tape so as to generate the appropriate electrical signals requisite for controlling machine element 12. Typically, the numerical input information is in a coded digital form related to the speed with which the cutting element 12 is to travel while performing its contouring function; it also indicates the X and Y departures and their direction for that cut, or the arc center offsets of the circular path to be generated if that particular cut is to be an arc of a circle. The instructions from input equipment 21 are then routed throughout the control section in accordance with the programmed addresses.

Another type of input is also provided for the control section in the form of a train of pulses generated from a reference clock or oscillator 23. This pulse clock, as is well known in the digital computer art, provides the carrier by which the command signals are transported throughout the control section; it also provides a reference pulse rate input to the servo loop section. Thus, the output of the pulse train generator or clock 23 is applied along its output lead 24 to both the control section of the contouring system along leads 25 and 26, and also to the servo loop section on lead 27. Lead 27 is coupled to the input of the position feed back resolver 16 through the intermediary of a pulse rate divider 28, while the output from clock 23 is applied to the control section on lead 25 as an input to the velocity command block 29, through the intermediary of the pulse rate divider 30. There is no pulse rate divider in lead 26 between clock 23 and the Y-axis command phase counter 31. The insertion of pulse rate divider 30 in lead 25, and divider 28 in lead 27, as well as the absence of a pulse rate divider in lead 26, result in adapting the reference pulse rate from clock 23 for use in different parts of the system having different functions and operating characteristics.

The pulse rate fed into the control section, and the total number of pulses fed into the control section for any given path, define the commanded velocity with which it is desired the machine tool shall move and the total length of the path it is desired that the machine tool traverse. In short, the pulse rate and the total number of pulses are the mechanisms upon which the electronic equipment in the control section operate to provide command signals, subsequently to be converted into the velocity and distance of travel executed by the machine tool.

The function of the velocity command block 29 is to convert a reference pulse rate entering from the pulse rate divider 30 on lead 33 into a pulse rate represented by a number (commensurate with required velocity of motion) punched into the input tape and fed into the system at input data equipment 21. This number is referred to as the feed rate number, and will hereinafter be explained in greater detail. The feed rate number is therefore applied from input 21 along leads 22 and 35 as another input to the velocity command 29. If the punched tape commands a feed rate number of 200 inches per minute, the velocity command from block 29 would operate upon the pulse rate on input lead 33 to provide an output pulse rate on lead 36 of 33.3 kilocycles per second (which is equal to 200 inches per minute with each pulse representing .0001 of an inch). Velocity command block 29 also performs the very important functions of manual feed rate over-ride and automatic acceleration and deceleration. The output pulse rate, commensurate with command velocity, is applied on lead 36 to the function generator 37.

The function generator operates in two modes. The first mode generates command signals for straight line cuts at any angle, sometimes referred to as slope generation or linear interpolation. The second mode generates command signals to perform circular line cuts with a specified radius, also referred to as circular interpolation. For the purposes of discussion relative to FIGURE 2A, consider function generator 37 in its relationship to the rest of the system operating solely in the first mode as a slope generator.

Function generator 37 resolves the command velocity entering on lead 36 into two component pulse rates commensurate with required velocities in the X and Y directions. This resolution is performed in accordance with the X and Y departures programmed into the punched tape and applied to the function generator 37 from input equipment 21 along the leads 22 and 34. Thus the input pulse rate to function generator 37 is multiplied by a factor which is directly proportional to the sine of the slope angle of the path cut relative to the X axis to obtain the required Y component of velocity, and is multiplied by the cosine of that angle in order to obtain the required X component of velocity. The X and Y outputs of function generator 37, therefore, are two pulse rates commensurate with the Y and X components of velocity required for the motion of the cutting tool. The X and Y pulse rates are applied as outputs on lead 40 and 39, respectively. Between 39 and 40, and the X and Y feed mechanisms 13 and 14 of machine tool 11, the circuitry for handling the output on lead 39 is identical to that for the output on lead 40. Accordingly, the following discussion will be restricted to the Y coordinate system.

The Y pulse rate output on lead 39 from the function generator 37, is applied to two different circuits, simultaneously. Along lead 41 from lead 39, it is applied to the Y-axis distance counter 42, while along lead 43 from lead 39, it is applied to the Y-axis command phase counter 31. Distance counter 42 controls the length of the path along which the machine element 12 travels for the cut being made. Command phase counter 31 controls (relative to the position feed back resolver 16 through the intermediary of the discriminator 18) the velocity of motion of the machine element 12 for the cut.

Since each pulse represents an incremental distance which the cutting tool 12 travels, counting the pulses in distance counter 42 that exit from function generator 37 is the same thing as measuring the distance which the cutting tool 12 travels along the path. When counter 42 totals a number of pulses equal to the desired path length, its operation stops as does the movement of machine tool cutting element 12. Counter 42 is informed at the beginning of each path, as to the total count required to achieve the desired path length. This input data is applied to counter 42 from input equipment 21 along leads 22 and 44.

The motion of the machine tool is controlled in the command phase counter 31. In command phase counter 31, not only is the required Y coordinate pulse rate applied thereto along lead 43, but the reference clock pulse rate is also applied as an input from clock 23 along leads 24 and 26. Consider what happens if the Y feed rate command requires no motion in the Y direction, and the simultaneous condition that the machine tool is at rest in correspondence with the command. Under these circumstances, the pulse rate output from function generator 37 on lead 39 is zero, thereby maintaining a constant phase on the phase modulated pulse train output from phase counter 31. Both phase counter 31 and resolver 16 are adapted to provide outputs which are of precisely the same pulse rate, and in phase, under these conditions. Accordingly, there is a zero error signal output from phase discriminator 18 and the cutting element remains motionless. However, if a pulse rate output from function generator 37 does appear on leads 39 and 43, and therefore a pulse train representing a commanded velocity is fed into command phase counter 31, then the pulses on lead 43, as well as the clock pulses on lead 26, are counted by phase counter 31. If the direction of motion commanded by the programmed tape is in a negative direction, the pulses on lead 43 are subtracted from the clock pulses in the command phase counter. Whether the direction is positive or negative with respect to the Y coordinate, is indicated to command phase counter 31 by a signal applied from the input equipment 21 along leads 22, 45 and 46. The addition or subtraction of pulses in the command phase counter 31 has the net effect of either advancing or retarding the phase of the output pulses from the phase counter on lead 19, respectively, relative to the output pulse train from the synchro resolver 16 on lead 17. Accordingly, position servo 9 drives the Y-axis feed mechanism in the appropriate direction and at a rate proportional to the error signal developed in discriminator 18. As Y-axis feed mechanism 13 continues its motion, it will eventually traverse the entire distance required for the specific cutting operation. When this distance is completed, it is recognized in the Y-axis distance counter 42 and a blocking signal is generated therefrom along lead 93. This blocking signal is applied to command phase counter 31 in a manner so as to stop the input thereto from function generator 37. When this happens, pulse rate signals can no longer be added to the clock pulse rate in command phase counter 31, with the result that the phase of the output from phase counter 31 can no longer be changed.

NUMERICAL CONTOURING SYSTEM—IN DETAIL

Figure 2B:
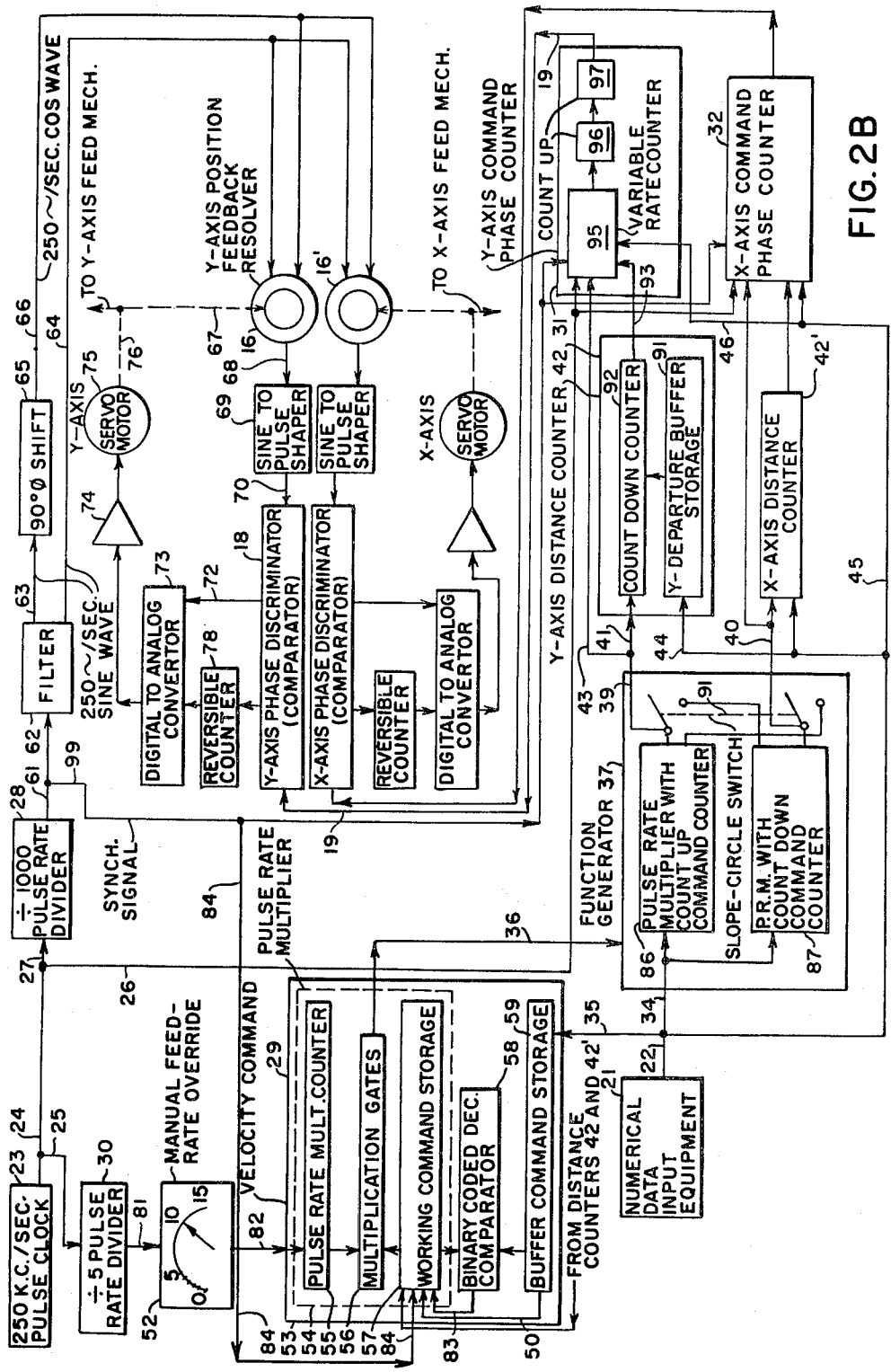
FIG. 2B is a block diagram of a numerical contouring control system shown in greater detail than that of FIG. 2A and which highlights the environment within which the various features of the invention are applied in the manner shown in FIGS. 10 through 17.

With the broadly stroked description of the relationship between the sub-systems of the numerical contouring control system as background, consider now FIGURE 2B which shows the system in block diagram form sufficiently detailed to more clearly highlight the specific system environment into which fits the preferred embodiment of the tool offset correction system in accordance with the invention. The offset correction system will be described in detail relative to FIGURES 10 et seq.

SERVO FEED-BACK LOOP

Consider first, the application of the actual position information of the cutting tool into the Y-coordinate servo loop. At the top left-hand corner of FIGURE 2B, the basic clock pulse rate is generated in the pulse clock 23 which provides a pulse train output of 250 kilocycles per second. Each pulse cycle has a period of 4 microseconds with each pulse having a width of 2 microseconds. The 250 kilocycle pulse train is applied along leads 24 and 27 to a divide by 1000 pulse rate divider 28. Pulse rate divider 28 is a three decade counter so that on its output lead 61 is propagated a pulse train of 250 cycles per second, i.e., 250 kilocycles divided by 1000. Pulse clock 23 and divider 28 used to obtain the 250 cycle per second pulse train on lead 61 are devices well known in the digital computing art for generating a clock or reference frequency and for dividing that pulse rate or frequency into one or more pulse rates utilized for controlling various parts of the system.

The 250 cycle pulse train is applied on lead 61 to a filter 62 which serves in a manner well known in the art, to derive from the square wave train a 250 cycle per second sinusoidal wave. The output of filter 62 is applied to two different output leads 63 and 64. Lead 63 couples the sine wave to a 90° phase shifter 65, with the result that the output of phase shifter 65 is a 250 cycle per second cosine wave on lead 66. The sine and cosine voltages are applied as two-phase excitations to the stator windings of synchro resolver 16. The two-phase excitation of the stator windings produces a uniform magnetic flux rotating at 250 revolutions per second in the two pole resolver 16. With the rotor in a stationary condition, the output voltage of the single phase secondary winding of resolver 16 is a single phase voltage of 250 cycles per second (in the form of a sine wave potential) whose phase is dependent upon the rotor position of the resolver.

Rotation of the rotor produces a phase shift of the output signal in the ratio of 360° of phase shift per revolution of the shaft driving the rotor. The shaft, represented by mechanical linkage 67, is mechanically coupled to the Y-axis feed mechanism of the machine tool. The gearing and coupling is such that one 360° revolution of the resolver rotor, is equivalent to .1 of an inch of motion of the cutting tool along the Y-axis. One revolution of the rotor may be conveniently broken down into 1000 angular increments commensurate with increments of motion of the cutting tool along the Y-axis of .0001 of an inch per angular increment (although it is to be understood that the actual resolution of the resolver is infinite). This angular incremental break-down is matched elsewhere in the control section (as was discussed above and will be discussed in more detail below); one pulse in the control section represents a commanded increment of motion of .0001 of an inch for the machine tool.

The 250 cycle per second sinusoidal output voltage of resolver 16 is applied on lead 68 to a "sine to pulse" shaping or converting network 69. Such a network, well known in the art, functions to limit the amplitude and shape the sinusoidal voltage such that the output from shaper 69 applied along lead 70 to Y-axis phase discriminator 18 is a 250 cycle per second square wave pulse train. This square wave signal is the feed back signal which is indicative of the position of the feed back resolver shaft to within one revolution of the shaft. The phase of the 250 cycle pulse train is indicative of the position of the feed back rotor to well within a 1,000th of one full revolution. During rotation of the resolver rotor, the phase of the resolver output signal increases for rotor rotation against the direction of flux rotation within the resolver, and decreases for rotation with the direction of flux rotation, by an amount proportional to the velocity of rotation. Consequently, the lagging or leading in phase of the output from resolver 16 (relative to the reference output on lead 61 from divider 28) applied to discriminator 18 provides an indication of the machine tool's position in an absolute sense; the phase of resolver output relative to the output of phase counter 31 indicates the direction of required motion.

The phase discriminator

The reference, of course, is the commanded position and velocity that is desired for automatically controlling the machine tool. This commanded reference is similarly in the form of a 250 cycle per second square wave applied as an input to Y-axis phase discriminator 18 on lead 19. Phase discriminator 18 compares the commanded signal applied to it on lead 19 from command phase counter 31 with the signal applied to it from the resolver on lead 70. The difference in phase between these two signals constitutes the error signal applied in the servo loop. Thus, such an error signal is applied from discriminator 18 on output lead 72 to a digital to analog converter 73 which functions to convert the phase difference, if any exists, into a D.C. analog potential. This error signal potential is applied to a conventional D.C. operational amplifier 74 which in turn drives the Y-axis servo motor 75. The feed back loop is completed through a feed motor and its shaft 76, which is coupled in turn to the shaft 67 of the resolver rotor as well as to the Y-axis feed mechanism. If the signals applied to the discriminator on lead 70 and 19 are of the same frequency and phase, then the phase difference is zero and there is no error signal out and no motion commanded by the servo loop. This condition conforms to a commanded velocity of zero from the control section and a Y-axis feed mechanism motion of zero.

Let us assume, however, that the control section commands a velocity of motion for the machine tool which is different from the present velocity of the machine tool. This will be done by continuously changing the phase of the command signal applied to the discriminator along lead 19. As the phase of the signal applied to the discriminator shifts relative to the phase of the signal applied thereto on lead 70 from the feed back resolver 16, the phase difference detected at discriminator 18 between the command signal and the feed back signal tends to increase; an error signal is thereby built up. This error signal causes servo motor 75 (through a feed motor) to rotate the resolver rotor in such a direction as to bring this phase difference back to a minimum. For a steady rate of phase shift of the command signal applied to the discriminator on lead 19, the resolver rotor rotates at such a speed as to maintain a constant phase shift difference at discriminator 18. An increase in command speed causes this phase difference to increase sufficiently to cause the error signal to be adequate to drive the servo motor at the higher velocity. When the command signal is brought to a zero rate of phase shift, the feed motor moves the feed back resolver rotor to such a position as to produce a feed back signal in exact phase correspondence with the command signal. Contouring is obtained by causing the phase of the command signal applied to the discriminator to change at such rates and by such magnitude as is required to produce the desired motion of the machine tool.

Discriminator 18 includes the reversible counter 78. This extended range discriminator insures that the digital to analog converter 73 provides an output error signal which is directly proportional to any phase difference whether it be less than or greater than 360°. Specifically, the reversible counter 78 senses the phase difference generated in the discriminator 18. For every full cycle of difference, whether leading or lagging, it excites the digital to analog converter in such a way that the output of converter 73 is a D.C. potential directly proportional not only to the fractional cycle phase difference, but to the additional full cycle phase differences registered in the reversible counter 78. The extended range of operation of the phase discriminator 18 is described in greater detail below in connection with FIGURES 28 through 32.

Having thus described the operation of the Y-coordinate feed-back loop in FIGURE 2B, everything else in FIGURE 2B is the control section and is directed to providing the appropriately phased command signal on lead 19 to be applied to the discriminator 18.

*Numerical data input equipment*

The input to the control section is through the numerical data input equipment 21. It is through this equipment that the desired program for the operation of the machine tool is introduced as punched tape carrying the programmed information in the form of binary-coded-decimal representations. The programmed punched tape is "read" at the input equipment 21 by conventional punched tape reading means. Particularly appropriate for binary-coded-decimal punched tape equipment of this control system is the Friden Flexowriter, model SPS. The punched tape reader converts the binary-coded-decimal representation into electrical pulses which are also in the binary-coded-decimal form. These pulses are then routed over the output lead 22 to the various portions of the control section command system for directing the activities of these various sub-systems. Appearing immediately below, is a typical program manuscript which may be punched into the tape in binary-coded-decimal form.

direction (simultaneously with X coordinate motion). The X and Y departure columns with their X and Y addresses, have a plus or minus sign indicating whether the motion is to be in the positive or negative direction along those coordinates. The X and Y arc center offset data are comparable to the X and Y departure data, for defining the path for circular interpolation. The last column is the Feed Rate Number. This is the instruction which determines the speed with which the cutting tool moves relative to the workpiece. For each numerical data instruction there is associated with it the address that properly routes that instruction to that part of the control section where it is to be utilized. In order more readily to correlate FIGURE 3 with the Program Manuscript table, the following relations are set forth. $R_H$ is the radius of the circle for the arc from point C to point D. $K_D$ is the "Y" arc-center offset, and $J_D$ is the "X" arc-center offset.

In order to resolve the resultant feed rate into its X and Y components, so that motion in these two coordinates may be initiated, it is necessary to multiply the feed rate by the sine and cosine of the slope angle, i.e., arctangent $(Y\ departure/X\ departure)$. However, nowhere in the Program Manuscript shown are the sines and cosines of any angles actually represented (although they may be used if the programmer so desires). This is because the X and Y departures themselves are utilized for obtaining the appropriate X and Y feed rate components from the overall resultant feed rate. This may be done by using the following simple linear equation:

$$F_C = 10F_D/\text{length of line or slope}$$

where $F_C$ is the feed rate command as set forth in the

TABLE 1.—PROGRAM MANUSCRIPT

| From Data Point | Data to Point | Program Selection | X Departure | Y Departure | Y Arc Center Offset | X Arc Center Offset | Feed Rate Number |
| --- | --- | --- | --- | --- | --- | --- | --- |
| A | B | g1 | X+5.0000 | Y+0.0000 |  |  | f020 |
| B | C | g1 | X+6.0000 | Y−1.7500 |  |  | f016 |
| C | D | g3 | X+2.5000 | Y−3.7500 | k 3.7500 | j 1.5000 | f025 |
| D | E | g1 | X+0.0000 | Y−1.0000 |  |  | f100 |
| E | F | g2 | X+1.0000 | Y−1.0000 | k 0.0000 | j 1.0000 | f100 |
| F | G | g2 | X+1.0000 | Y+1.0000 | k 1.0000 | j 0.0000 | f100 |

Such a program would be used to command a series of cuts or paths to form the tool contour shown, for purposes of illustration, in FIGURE 3. Each row of the table consists of one block of information required for performing one specific cut between two points. Thus from Point A to Point B, a slope rather than a circular cut is required. Since the cut is horizontal, the instruction for the Y departure is zero. The columns of the Program Manuscript Table commencing with the "Program Selection" column, and ending with the last column, entitled "Feed Rate" include the types of information actually punched into the tape. The two columns on the left are presented merely for relating the data blocks of the program with the contour to be cut of FIGURE 3.

The program selection for the first path or cut from A to B is coded as g1 and means that a straight line, according to some slope, must be cut. The letter "g" is the address, and "1" the slope instruction. This straight line slope control is referred to in the art as "linear interpolation." The third row in the program selection column indicates a g3 program. This means a circular arc must be cut (circular interpolation) in a counter-clockwise direction, while a g2 program selection requires a circular arc in the clockwise direction.

The X departure column indicates the distance the machine tool must traverse in the X direction from its present point location in order to complete the cut, e.g., in the first row the X departure takes the cutting element from A to B. Similarly, the Y departure is the distance the tool must traverse from the present point in the Y last column of the table, $F_D$ is the feed rate actually desired for the cutting tool in inches per minute. With this feed rate command, the X and Y departures may be used in lieu of the sine and cosine of the slope angle.

Numerical data input equipment 21 additionally includes appropriate gating circuitry, to aid in routing the numerical instructions to the appropriate circuits in the control system in accordance with their addresses. Both the punched tape reading equipment and the associated routing circuitry are well known in the art and are not further described here.

With the required address and instruction information available at the appropriate portions of the control section by virtue of the punched tape reading and routing circuitry of input equipment 21, we may now consider the operation of the control section responsive to these instructions.

*Velocity command*

The 250 kilocycles per second output of pulse clock 23 is applied on lead 24 and thence lead 25 to a divide by 5 counter which produces an output of 50 kilocycles per second. Since each pulse represents an incremental distance of .0001 of an inch of linear motion, the pulse rate from counter 30 represents a linear motion of 5 inches per second, or 300 inches per minute. Control of velocity and distance is exercised in subsequent sub-systems of the control section by dividing this 50 kilocycle per second pulse rate down to lower pulse rates for lower velocities and by counting the total number of pulses to get specified magnitudes of displacement.

The output of divider 30 is applied on lead 81 to the manual feed rate over-ride 52 and thence on its output lead 82 to the velocity command system 29. Manual feed rate over-ride 52 has an important function to be discussed below. However, for the purposes of the immediate discussion only, consider the manual feed rate over-ride 52 as merely performing the function of dividing the input 50 kilocycle pulse rate, down to an output pulse rate on lead 82 of 33.3 kilocycles. This 33.3 kilocycle pulse rate corresponds to a cutting tool feed rate of 200 inches per minute. For normal operation of the contouring control system, this 200 inches per minute feed rate is the maximum rate. Under certain conditons, this maximum may be increased by use of the manual feed rate over-ride 52.

The function of velocity command system 29, in one important aspect, is to lower the incoming pulse rate on lead 82 by the proper amount so as to obtain an output pulse rate of lead 36 corresponding to the programmed linear velocity or command feed rate. Thus, the feed rate in the last column of the program manuscript table above, dictate the extent to which the incoming pulse rate will be reduced in accordance with the desired feed rate. By way of example, assume the desired feed rate is 100 inches per minute. Velocity command 29 accordingly selects an average of 1 out of each 2 input pulses (coming in at a pulse rate of 33.3 kilocycles equal to 200 inches per minute), and furnishes this reduced pulse rate as an output on lead 36. Similar output ratios may be obtained for other required velocities. This is accomplished in velocity command 29 by pulse rate multiplier 54 the major components of which are the pulse rate multiplier counter 55, the working command storage or register 57, and the multiplication gates 56 which interconnect the PRM counter 55 and the working command storage 57. PRM counter 55 and working command storage 57 (as well as the rest of the control section) operate in the binary-coded-decimal form, as does the data from the punched tape equipment 21.

PRM counter 55 cyclically counts 200 pulses. Working command storage 57, has set into it, indirectly, a number from input equipment 21, which is the command feed rate in inches per minute. If the number in storage 57 is 200, then multiplication gates 56 are gated to permit 200 pulses out on lead 36 for every 200 pulses in on lead 82. If a feed rate of 100 inches per minute is stored in working command storage 57, then only half of the pulses in to counter 55 during any period of time would pass through to output lead 36. In this way, any decimal fraction of the pulse rate input to velocity command 29 may be derived as an output pulse rate, for utilization in subsequent portions of the control section.

It is of importance that whatever pulse rate appears on the output lead of velocity command 29, the distribution of pulses be reasonably uniform with respect to time. It may be recalled that the application of the command signal from the control section command phase counter 31 to the servo mechanism is through phase discriminator 18 which functions to compare the phase of the command counter output signal with the phase of the feed back signal. A command signal from the control section which has bunched or irregularly grouped pulses to represent a pulse repetition rate would be a poor vehicle indeed to carry command signals to the phase counter and phase discriminator.

For this reason, PRM 54 is of a special type in that the PRM counter 55 is arranged to count in a binary-coded-decimal form which is different from the binary-coded-decimal form for which working command storage 57 is adapted. The combination of these two uniquely related code forms, with the intermediary of special gating circuitry in multiplication gates 56, provides a uniformly distributed output pulse train on lead 36 appropriate for utilization in a phase sensitive system. The detailed logic circuitry and operation of PRM 54 will be described in detail with reference to FIGS. 6–7C.

Data input from tape equipment 21 to velocity command 29 and in particular to PRM 54, is through the intermediary of the buffer command storage register 59 located in velocity command 29. Buffer storage 59 holds the new command until completion of the previous block of punched tape commands. Upon this completion, the data in buffer storage 59 is instantly transferred to working command register 57 on lead 50. Upon completion of this transfer, the data input section 21 again functions to reload buffer storage 59 with instructions from the next following block of punched tape data. Thus, input equipment 21 reloads buffer storage 59 during the time that PRM 54 is processing the preceding block of data. Buffer storage of this type is used throughout the control section wherever instructions from the input equipment 21 is required for the operation of that particular sub-system. Without buffer storage, there would be a delay between successive paths, or other operations, since the input data from the tape could not be applied instantaneously to the working storage registers but would have to be read into them from the tape at the completion of each operation.

In the case of the velocity command 29, however, instantaneous transfer of input data to working storage 57, is not the only reason for the inclusion of a buffer command storage register. The buffer command storage 59 is an integral part of the automatic acceleration and deceleration portion of the contouring control system. It is sometimes desirable to change the velocity upwardly or downwardly at the end of a cut or immediately at the begining of a new cut when the two successive cuts are programmed at widely different velocities. A smooth and gradual velocity transition is obtained through use of the automatic acceleration or deceleration apparatus.

Automatic acceleration/deceleration is accomplished in velocity command 29. Consider the situation wherein the end of a cut is being approached, and the next cut should have a feed rate number which is considerably less than that of the preceding cut. During the current cut, the feed rate is stored and used in working command storage 57. Instructions for automatic acceleration comprise, among other things, a separate block of data which modifies only the velocity relating to the last previous block specifying a given path. The feed rate number for automatic acceleration is inserted in buffer command storage 59. Thus the number in buffer 59 is less than the number in working storage 57. At an appropriate distance before the end of the cut, selected by the automatic acceleration program, a signal from distance counters 42 and 42′ is generated indicating that automatic acceleration is to begin.

The binary-coded-decimal comparison circuit 58 simultaneously senses the working and buffer storages 57 and 59 to ascertain which holds the larger number. If the two stored numbers were the same, there could be no output from the comparator 58. However, in this situation the number in working storage 57 is larger than that in buffer storage 59. Accordingly, there is an output from the comparator 58 on lead 83 which, with the signal generated from distance counters 42 and 42′, permits the application of a pulse train on lead 84 to working storage 57. Lead 84 is provided with a pulse rate taken directly from the output of the pulse rate divider 28 and therefore under ordinary circumstances applies a pulse rate of 250 cycles per second directly to the working command storage.

The working command storage 57 is actually a reversible binary-coded-decimal counter. Accordingly, if the output from comparator 58 indicates that the number in working storage 57 is greater than that in buffer storage 59, it actuates the reversible counter storage 57 through lead 83 in its countdown rather than count up mode of operation. In this way, the number stored in working command storage 57 continuously decreases at a 250 cycles per second rate until it equals the number stored in buffer command storage 59. When this happens, the comparator 58 has no output and the pulse train applied to working storage counter 57 on lead 84 is blocked. This means that the present feed rate number has now been converted to the feed rate number programmed for automatic acceleration.

The result of this process on the output of PRM 54 of velocity command 29 may be readily comprehended. The pulse rate representing resultant command velocity or feed rate number on lead 36 continuously changes from the rate commanded before deceleration was ordered to the rate required by the deceleration block of data. With this automatic acceleration or deceleration circuitry, it is possible to gradually convert a present velocity at the machine into the velocity for the next cut (at any desired rate of change). The transition may be achieved more rapidly by having a higher pulse rate than 250 cycles per second applied on input lead 84 to the reversible counter working storage 57.

In the actual operation of automatic contouring control equipment, it is sometimes apparent to the man overseeing the operation of the machine tool equipment, that a particular program under which direction the machine is operating, may possibly be improved. Thus, for example, it may be the case that the operator can see that a feed rate for a particular cut that was programmed into the tape may be too slow, or it may possibly be too fast. To enable the operator to vary the feed rate for any particular cut in accordance with his skill and knowledge, a "manual feed rate over-ride" control is provided, such that the feed rate may be changed from that of the programmed feed rate. This feed rate over-ride is represented by block 52. In essence, the feed rate over-ride is a special type of pulse rate multiplier inserted between leads 81 and 82 with a manual switch control which enables the operator to feed a number directly into the working command storage of the PRM of over-ride 52. In ordinary operation, the switch of over-ride 52 is placed in its indicated position on contact 10. This means that the 50 kilocycle input to the manual feed rate over-ride is converted into the 33.3 kilocycle output as discussed above. The switch of the over-ride 52 is a 16 position selector switch which permits the gating out of 0 to 15 pulses out of every 15 input pulses to over-ride 52, to thereby produce an output pulse rate which may vary from 0 to 50 kilocycles, in discrete steps of 3.3 kilocycles. When feed rate over-ride 52 is used to provide a zero output, it brings the entire contouring control system to a stop but synchronism is maintained throughout the system. The control system may then be started up by changing the selector switch to some position other than the zero position. Effectively, then, the output of over-ride 52 is a pulse rate commensurate with velocities from zero to 150% of whatever velocity is programmed for automatic operation. The output of feed rate over-ride 52 is applied to velocity command 29.

*Function generator*

Velocity command 29 propagates a train of pulses on its output lead 36 having a rate commensurate with the feed rate programmed into the punched tape. This is commensurate with resultant velocity that the cutting tool will travel relative to the workpiece. However, this velocity must be broken down into its X and Y components in order for the X and Y feed mechanisms to be individually actuated. Consequently, the pulse rate on lead 36 is applied as an input to function generator 37. Function generator 37 comprises two PRM's 86 and 87 (which actually use a single PRM counter in common). The pulse train from velocity command 29 is applied to the PRM counter in each of the two PRM's 86 and 87, related to the Y and X coordinates, respectively. The Y and X programmed departures are respectively applied to the working command storage registers in PRM's 86 and 87, from the numerical input equipment 21 along leads 22 and 34. For linear interpolation, therefore, the output of PRM 86 on lead 88 is the pulse rate into funtion generator 37 multiplied by a number commensurate with the sine of the slope angle of the path to be cut. Similarly, the output of PRM 87 on lead 89 is the input pulse rate multiplied by a number commensurate with the cosine of the angle. The Y output lead 39 is coupled to the Y-axis distance counter 42 while the X output lead 40 is connected to the X distance counter 42'. Accordingly, lead 39 has a pulse train appearing on it whose rate is representative of the commanded Y component of velocity while lead 40 has a pulse rate upon it which is directly representative of the X component of velocity. From this point on to the servo loop, the X and Y circuitry are exact duplicates of each other.

It is important to note that the pulse rate on output lead 39 from function generator 37 is applied to both the Y-axis distance counter 42 and the Y-axis command phase counter 31 along the leads 41 and 43, respectively.

*Axis distance counter*

The function of the axis distance counter is to count out, for each block of input data representing one path cut, the commanded number of pulses from function generator 37 into command phase counter 31 and then stop the command phase counter from accepting additional pulses when the commanded total displacement for the given axis is completed. Thus, if 2500 pulses are counted out into the command phase counter 31, these pulses will produce a motion command of 0.25 of an inch. The other axis might have a total distance count of 2317 pulses corresponding to a desired distance of motion along that coordinate of 0.2317 of an inch. When both axes have completed the specified displacement, new data, waiting in the buffer storage units of each of the two distance counters, is immediately transferred to the working registers of those counters, and the normal cycle is resumed on the new block of data. At the same time data is transferred from buffer to active storage appropriately throughout the entire control section.

The distance counter 42 includes a countdown counter 92 which has sufficient counter capacity to accept 99,999 counts, equal to a distance of 9.9999 inches. The Y departure for each block of data is applied from input equipment 21 along leads 22 and 44 to the Y departure buffer storage 91. Upon completion of the previous block of data, the Y departure stored in buffer storage 91, is immediately transferred to countdown distance counter 92 and effectively sets that distance counter to read the next Y departure. With the pulse train applied from function generator 37 along lead 39 as its input, the countdown counter 92 commences counting down toward zero from the Y departure magnitude initially set in it.

Upon reaching the zero count the last decade of countdown counter 92 provides an output pulse from distance counter 42 on lead 93 which is an input to the first decade 95 of Y-axis command phase counter 31. This signal blocks or disables the command phase counter 31. Consequently, when Y-axis distance counter 42 has counted the number of pulses equal to the Y departure programmed into it, no more pulses are counted in the command phase counter 31 from the function generator 37. This ultimately has the effect of providing a zero command signal to phase discriminator 18. When the countdown counters of both the Y-axis and X-axis distance counters have generated an output as a result of the counters both reaching a zero state, and both command phase counters are therefore disabled, the condition is set for the next block of data to be acted upon. This means that both axes have completed their specified displacements, and the normal cycle is resumed on the next new block of data. At this time instructions in the buffer storage registers throughout the control system are transferred to the working storage registers.

Command phase counter

The command phase counters 31 and 32 are required for each axis to generate a command signal to the two phase discriminators. The command phase counter 31 comprises three decades of binary-coded-decimal counters 95, 96 and 97. All three are countup counters, but counter 95, which is the first decade of the three, is a variable rate counter in a special sense. It may be noted that the 250 kilocycle per second pulse train from clock 23 is applied as an input to the variable rate counter 95 along input leads 24 and 26. In the absence of contouring command signals on lead 43 from function generator 37 (due to a command zero velocity) or when the command velocity signal on lead 43 is blocked from being put in to counter 95 due to the completion of the count in Y-axis distance counter 42, command phase counter 31 counts only the 250 kilocycles per second pulses from clock 23. The three decades 95, 96 and 97, under these circumstances, count the 250 kilocycles down to 250 pulses per second on the output lead 98 of phase counter 31. It should be noted that the divide by 1,000 pulse rate divider 28 coupled to the output of clock 23 also counts down to 250 pulses per second in the same manner. When the control system is initially started up, command phase counter 31 is preset to 000 and then started counting after the divide by 1,000 pulse rate divider 28 completes one of its thousand counts. This may be seen to be implemented by the output lead 99 coupled from divider 28 to the input of variable rate decade 95 in command phase counter 31. Thus command phase counter 31 and the pulse rate divider 28 are initially synchronized to count together in exact correspondence with each other.

When a Y coordinate pulse rate is applied from function generator 37 along lead 43 to command phase counter 31, and when there is no blocking signal from distance counter 42 on lead 93 to the variable rate decade 95, then the variable rate decade adds or subtracts the feed rate pulses on lead 43 with the clock pulse train on lead 26. The feed rate pulses are added to the clock pulses if the command from the input equipment 21 on leads 22, 44, 45 and 46 indicates that an addition should be made, i.e., indicates that the Y component of velocity should be in the positive Y direction. If the instruction from input equipment 21 indicates that a negative Y departure is involved, then the pulses applied to the phase counter on lead 43 are subtracted from the clock pulses. The addition and subtraction is accomplished in the following manner. If addition is commanded from input equipment 21, then the simultaneous appearance of a pulse on leads 26 and 43 at the input of counter 95 results in the counter counting 2 rather than one for that situation. If subtraction is required by the appropriate command, then the simultaneous appearance of pulses on leads 26 and 43 results in the variable rate counter counting zero rather than counting a one.

The net result of this operation is that, when adding or upscaling in the counter, the ouput pulses on lead 19 from the last decade of the phase counter 31 jumps forward or advances in phase slightly; to be exact, it advances 1,000th of one cycle for the 250 cycle per second pulse rate. Conversely, if the counter subtracts or operates in a downscale direction, then the output lags or jumps back 1,000th of an output cycle for each subtracted pulse. This phase relationship is with reference to the output of the pulse rate divider 28 which also has a 250 cycle per second pulse rate. Thus, the greater the pulse rate on the input 43 to phase counter 31 from function generator 37, and therefore the greater the command Y-axis velocity, the greater will be the rate of change in the phase of the output signal from the phase counter 31 on lead 19 relative to the output signal from the pulse rate divider 28. The command of a positive or negative direction determines whether the phase is advancing or retarding with respect to output 61 of divider 28. This phase controlled signal on lead 19 is then applied to Y-axis phase discriminator 18 for phase comparison with the Y-axis position feed back signal applied to discriminator 18 from feed back resolver 16 (which was discussed above).

THE BASIC LOGIC BLOCKS

The overall system at this point has been described in sufficient detail such that the various aspects of the invention which fit in to the overall system may be properly comprehended. Accordingly, the detailed logic circuits and the description thereof for the various parts of the system will now be presented. In order to insure that the nomenclature is understood, FIGURES 4A through 4G are now presented with a brief explanation thereof. All of the figures subsequent to FIGURES 4A through 4G utilize the basic logic packages now to be described.

All digital logic circuits require devices to perform logic functions on the one hand, and storage or memory functions on the other. The logic functions in this system are performed by NOR packages as represented in FIGURES 4A through 4C. It is well known in the art that any Boolean equation can be synthesized with NOR logic exclusively. The memory or storage is provided by the bi-stable multi-vibrators or flip-flops represented in FIGURES 4D through 4G.

NOR logic, which is well known in the art, is shown symbolically in FIGURE 4A with inputs A and B and output C. The truth table for this logic block is represented in FIGURE 4B. Very simply, this logical function can be defined as follows: If, and only if, the A input, or the B input, or both, have the logic value 1 applied thereto, then the output C has the logic value of zero. Stating it another way, the output C is equal to zero if, and only if, one or both of the input leads assumes the logic value of 1. FIGURE 4C is a single input NOR package. This is an inverter, but the notation utilized is the same as that for FIGURE 4A. The output B of the inverter always takes on the opposite binary value from that of the input A.

There are many different circuits for mechanizing the logic components represented in FIGURES 4A and 4C. However, particularly useful transistor NOR circuits for use in this numerical contouring control system are disclosed in a standard text on transistorized digital logic components entitled "Design of Transistorized Circuits for Digital Computers" by Abraham I. Pressman, John F. Rider, Publisher, Inc., New York, 1959. More particularly, a preferred two input transistor NOR circuit is shown therein in Figure 8–1, at page 8–191. The inverter of FIGURE 4C may be mechanized by having solely one input to the NOR circuit of Figure 8–1 of the Pressman text. It is often the case, that the NOR package must handle more than two input variables. This is very readily mechanized since two or more NOR circuits may be placed in parallel to provide the required function. Thus, in Figure 8–16, at page 8–212 of the Pressman text, there may be found two NOR circuits in parallel to provide a zero output if, and only if, one or more of the four input leads has the logic value one applied thereto. The parallel array may be increased considerably so that a large number of inputs, indeed a few dozen inputs, may be arranged to perform this logic function. The overall system operation is not effected adversely by this paralleling of the circuits since each of the NOR circuits has a transistor amplifier therein, whereby appropriate potential and current values are readily maintained.

The bi-stable multivibrator or flip-flop which is used primarily for storage or memory, is shown in FIGURE 4D. This may be mechanized in accordance with the circuit in the Pressman text shown in Figure 11–7, at page 11–296, by opening each of the two loops connecting each of the output leads with its input steering lead. Electronic set and reset inputs may be implemented (to perform the logic functions to be described relative to FIGURE 4F) by applying two input signals to the bases of the two transistors of the flip-flop, respectively, through a series resistor connected to each base terminal. The logic of the multivibrator of FIGURE 4D is represented in the truth table of FIGURE 4E. In the device of FIGURE 4D, it may be noted that the input to the set and re-set trigger leads C and D are tied together such that C always equals D. In ordinary use in the following circuitry, the clock pulse train is applied to this C–D input. The clock pulse train is steered out of the flip-flop through either the G or the H output leads, dependent upon the state of the set steering lead A and the re-set steering lead B. In the truth table of FIGURE 4E, the output states for the leads G and H are represented both before and after the clock pulses are applied to C and D. Thus, the representation $G_N$ indicates the state of output lead G prior to the application of the clock pulse, while the representation $G_{N+1}$ indicates the state of the output lead G immediately after the application of the clock pulse. The notation for output lead H in the truth table is the same as for G. It may be seen that an output lead changes its state upon the application of a clock pulse, if, and only if, the output lead state prior to the application of the clock pulse is the same as the logic value applied to the steering lead on its side of the flip-flop. These values can be seen in the portion of the truth table enclosed by a heavy black line.

The logic value or state zero as herein used in the truth tables and description means that a positive voltage is applied to the indicated leads. The logic value one, on the other hand, is used for the zero or reference voltage. This notation is consistent with the practice followed in the authoritative text on logic switching and design by Keister, Richie, and Washburn, entitled "The Design of Switching Circuits," D. Van Nostrand & Company, 1951. The term "pulse present" as used in the truth tables means that the logic state on that lead has switched from state one to zero. If there has been no change in state, or the change has been from state zero to one, then there is a "pulse absent."

The flip-flop of FIGURE 4D has two additional inputs, the electronic set lead E and the electronic reset lead F. These two inputs completely swamp the flip-flop and override any condition that exists at that time. The truth table of FIGURE 4F, demonstrates the logic operation with the inputs E and F as the entering arguments. It may be noted that irrespective of any condition in the FIGURE 4E truth table, the application of a 1 to the E lead will place the G output in state 1, and the application of 1 input to the F lead will place the H output in state 1.

Figure 4H:
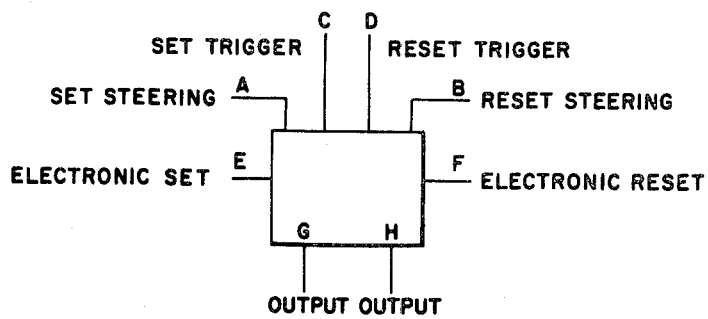

The flip-flop of FIGURE 4D need not have its input leads C and D tied to each other. The truth table which completely describes this logic is presented in FIGURE 4H.

The flip-flop of FIGURE 4D is very readily utilized as a binary counting stage of an overall pulse counter. FIGURE 4G shows the flip-flop arranged in a manner so as to perform this function. It may be noted that the output lead G is fed back as the input lead A and the output lead H is fed back as the input lead B. This feedback constrains the flip-flop to act as a counter such that every time a pulse appears on the tied input leads C–D, the outputs G and H of the flip-flops change their state. This may be seen very readily by referring to the truth table of FIGURE 4E. The flip-flop of FIGURE 4G is a special instance of the truth tables of FIGURES 4E and 4H in that A and $G_N$ must always be the same, and B and $H_N$ must always be the same. Under these circumstances, whenever a zero going pulse input, i.e., change in state from one to zero, is applied to the C=D lead, the output states G and H switch. The mechanization of such circuitry is shown in detail in the above-mentioned Pressman reference in Figure 11–7, at page 11–296.

COMMAND PHASE COUNTER—IN DETAIL

Figure 5:
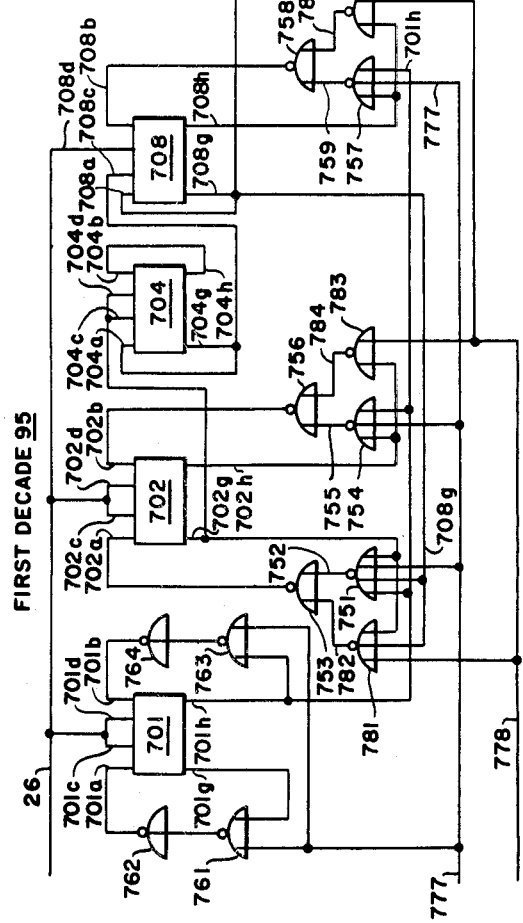
FIG. 5 is a logic circuit diagram of a command phase counter showing the details of a variable rate decade.

FIG. 5 is the circuit of the command phase counter 31 shown in block form in FIG. 2B and previously described to the extent of its relationship to the subsystems of FIG. 2B. It may be recalled that the output of the command phase counter 31 is a phase modulated pulse train applied on output lead 19 to phase discriminator 18 for comparison with the phase modulated pulse train representative of the actual position of the machine tool. The phase counter counts the incoming 250 kilocycles per second clock pulse train on lead 26 down to an output 250 cycles per second pulse train on lead 19. This is so because phase counter 31 comprises three decades, indicated in FIG. 5 as the first, second, and third decades. Furthermore, the output of phase counter 31 is phase modulated by virtue of either adding pulses (from function generator 37 on lead 43) to the clock pulse train applied on lead 26, or subtracting them from the clock pulse train, dependent upon whether the velocity is to be positive or negative and therefore whether the output phase of the counter is to be increasing in the leading or lagging sense.

Each of the three decades of FIG. 5 comprises four binary stages so as to represent a decade in binary-coded-decimal form of the type wherein the first binary stage, which represents the least significant digit in that decade, has the decimal weight of 1; the second stage is weighted 2; the third stage is weighted 4; and the fourth stage is weighted 8. The first decade shown on the left is the units decade; the second the tens decade; and the third is the hundreds decade.

The second and third decades are identical to each other. The first decade, which is the input decade, may include all the circuitry typical of a fixed rate count up counter but additionally includes special logic circuitry which permits the first decade to count at a variable rate. To comprehend the manner in which the first decade functions as a variable rate counting decade, it is first necessary to understand the operation of a binary-coded-decimal decade in a fixed rate mode of operation.

Consider the second decade. Each of its four stages, 711, 712, 714, and 718, comprises a counter flip-flop stage as shown in FIG. 4G and described above. The permutations of the output states of the four stages for ten successive clock pulse inputs to the first stage 711 is shown in FIG. 6.

Figure 6:
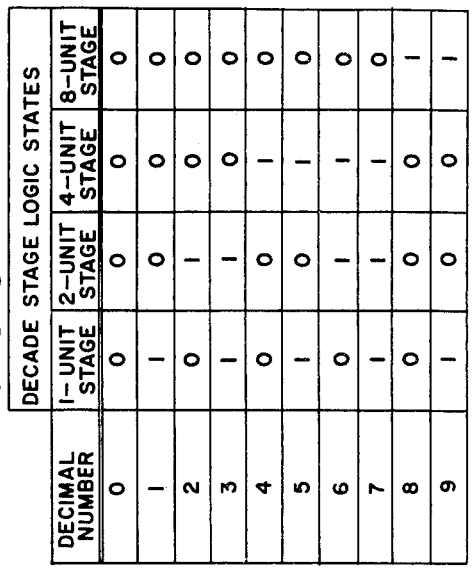
FIG. 6 is a table of binary-coded-decimal states of a decade counter representing decimal digits.

In FIG. 6, the left-hand column represents the decimal numbers 0 through 9 that may be represented in the second decade by logic state permutations in binary-coded-decimal form. Counting from 0 through 9 is achieved by pulsing the input stage 711 ten times, successively. The second through fifth columns of FIG. 6 represents the states of the four counter stages of the decade for the decimal digits 0 through 9. Thus, each row of FIG. 6 commences with a decimal number followed by a permutation of four logic states for the four binary stages which constitutes the binary-coded-decimal representation for that decimal number.

This representation is for the typical counting arrangement for a binary-coded-decimal count-up decade in fixed rate operation. Reference to the 1-unit stage column demonstrates that it changes state with each input pulse. Stage 712 (the 2-unit stages) changes state on every second input pulse applied to stage 711 except over end from 9 to 0. The 2-unit stage 712 pulses the 4-unit stage 714 to the one state on the fourth input pulse to the 1-unit stage 711 and to the zero state on the eighth input pulse to 711. When 4-unit stage 714 switches to the zero state, it pulses the 8-unit stage to the one state. On the tenth input pulse to 1-unit stage 711, its change of state pulses the 8-unit stage 718 so as to change the state of stage 718 to the zero state, thereby producing an output pulse on the lead to the next decade (on the output lead 19 to the phase discriminator 18 in the instance of the third decade). Thus this output occurs at the completion of every tenth count to the input stage 711. The 2-unit stage is precluded from changing state with the application of the tenth pulse to the 1-unit stage, by a blocking signal generated by the 8-unit stage when it switches to a one state for the decimal counts of 8 and 9. All four stages are then in their zero state representing decimal digit zero.

This is the type of counting that is required for the first decade when fixed rate counting is to occur. It may be recalled that fixed rate counting is to occur when there is an absence of pulses on input lead 43 from function generator 37, or when the input pulses on lead 43 are blocked by the output on lead 93 from the distance counter (see FIG. 2B).

When there are pulses applied to the first decade on lead 43 and simultaneously there is an indication for a negative direction of motion along the Y coordinate, then one pulse is to be blanked from the clock pulse train on lead 26 for every pulse that appears on lead 43 from the function generator. This is equivalent to subtracting a pulse from the totality of pulses in the clock pulse train for every pulse that appears on lead 43. This blanking operation is accomplished at the input to the first stage of the variable rate input decade. This occurs for each pulse on lead 43 as long as there is a negative direction signal controlling the operation of the counter.

When, however, the movement along the Y coordinate is to be in the positive direction, the counter should count not only the pulses of the clock train on lead 26 but also the pulses applied to the counter on lead 43 from the function generator. This is accomplished by having the counter count two rather than one for every simultaneous occurrence of a pulse on lead 26 and on lead 43 at the input to the variable rate decade. To make the counter count two counts instead of one, it is necessary to change the states of the counter stages by the equivalent of a count of two. This is accomplished when the counter is registering a count of 0 to 7 inclusive by changing the state of the 2-unit stage of the variable rate decade rather than changing the state of the input 1-unit stage.

Looking at the tabel of FIG. 6 for the rows 0 through 7, it may be seen that changing the state of the 2-unit counter stage and leaving the 1-unit counter stage undisturbed does, in fact, change the permutations of the stages such that a count of two rather than a count of one is accomplished. In the decimal digit 0 row, changing the 2-unit stage from zero to one results in a permutation of states identical to the permutation of states for decimal digit row 2. Changing that same 2-unit stage from zero to one for decimal digit row 1 results in the identical permutation of states shown in decimal row 3.

The situation for the successive decimal number is somewhat different. In decimal row 2, changing the state for the 2-unit stage from one to zero, does not, of and by itself, result in the permutation of states required for decimal row 4. However, changing the state of the 2-unit stage from one to zero automatically results in an output from the 2-unit stage to the 4-unit stage, whereby the 4-unit stage is changed from the zero state to the one state. This is the same as the permutation of states representing decimal row 4. A similar effect accomplishes the change of permutations from the decimal 3 representation to the decimal 5 representation.

The decimal 4 row is changed to the decimal 6 row in the same way as the decimal 0 and 1 rows were changed to the decimal 2 and 3 rows, respectively. In the same way, the decimal 5 row is converted to the decimal 7 row.

The decimal 6 row, on the other hand, is somewhat more complicated. Changing the state of the 2-unit stage from one to zero results in pulsing the 4-unit stage from one to zero. However, at this point, pulsing the 4-unit stage from one to zero also produces an output to the 8-unit stage which pulses it from zero to one. This provides the appropriate representation for decimal row 8. It may be seen that changing the decimal row 6 by changing the 2-unit stage results in exactly the same thing as changing the 2-unit stage for decimal row 7, i.e., it is the same as the change brought about from decimal row 7 to decimal row 8, ignoring the 1-unit stage which is unaffected when the 2-unit stage is pulsed. The change in state of the 2-unit stage of decimal row 7 in a similar manner results in a permutation which is the same as that of decimal row 9. This change in state from one to zero in pulsing the 2-unit stage of decimal row 7, results in an output pulse which changes the 4-unit stage from state one to state zero and a pulse to the 8-unit stage which changes the state from zero to one.

When a count of 2 is to be added to a permutation of states representing decimal 8 or 9, however, the state of the 8-unit stage must be changed rather than the state of the 2-unit stage. That changing the state of the 8-unit stage will, in fact, do the job may readily be seen. Decimal 8 plus 2 is equal to decimal 10; this means the entire decade must go to 0 (a 0 on each of the four stages of that decade) with an output or carry pulse over to the next decade. Decimal row 8 shows that the only stage that is in the one state is the 8-unit stage. Changing that state to zero results in all four stages being zero and produces, of necessity, an output pulse to the next stage. Similarly, adding or counting 2 onto the permutation of decimal row 9 should produce decimal 11, which is the same as a decimal 1 with a carry over to the next decade. It may be seen that changing the 8-unit stage in decimal row 9 from one to zero, results in a permutation exactly the same as that shown in decimal row 1 and, of necessity, produces an output pulse to the next decade from the 8-unit stage.

The circuitry required in the variable rate counter for gating the 2-unit and 8-unit stages in accordance with the above description and for blocking the application of clock pulses to the counter when a negative direction Y coordinate signal is applied as shown in detail in the circuitry of the variable rate counter decade 95 of FIG. 5.

Figure 7:
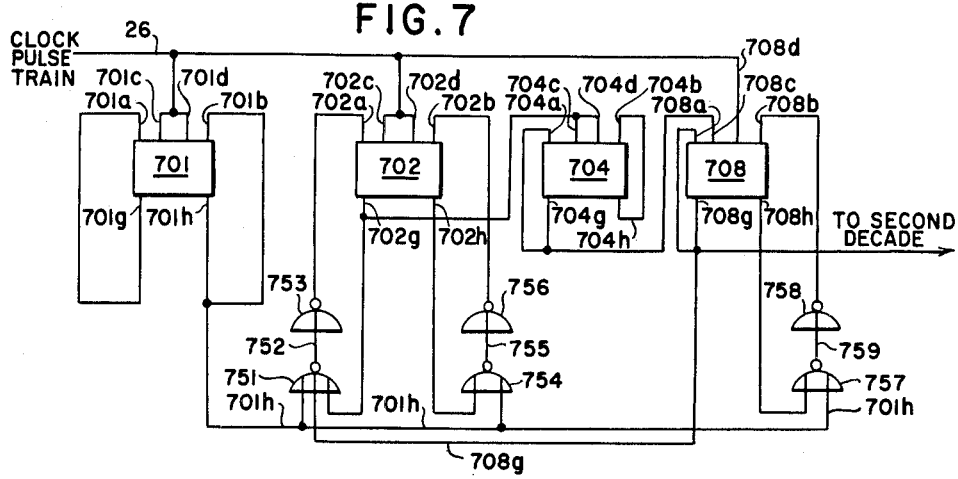
FIGS. 7 and 8 are two logic circuit diagrams showing decade circuits included in the variable rate decade of FIG. 5.

Decade 95 of FIG. 5 has circuitry which may best be understood by considering it in parts. Thus, before going into a detailed explanation of all of the circuitry of decade 95 in FIG. 5, reference will be made to the fixed rate binary-coded-decimal decade shown in FIG. 7, and then to the decade shown in FIG. 8. The decade of FIG. 7 is a fixed rate count up decade, the exact circuitry of which is included in the variable rate decade 95 of FIG. 5. Thus, the circuitry of the decade of FIG. 7 may be used for the second decade 96 and the third decade 97 of FIG. 5. On the other hand, a more conventional fixed rate binary-coded-decimal counter decade may be used for decades 96 and 97, such as is disclosed in Fig. 9–1 of "Digital Computer Components and Circuits" by R. K. Richards, D. Van Nostrand Co., Inc., 1957, at pages 399 and 400. After the fixed rate decade of FIG. 7 is explained, reference will be made to the decade of FIG. 8 which is identical to that of FIG. 7, except that additional circuitry is added so that the application of an appropriate signal will completely arrest the counting operation of the decade, while the absence of that signal permits the decade to count in the same fixed rate manner as it does in FIG. 7. The decade 95 in FIG. 5 will then be explained since it includes all of the circuitry of the decades of FIGS. 7 and 8 plus additional logic components which constrains decade 95 to count by two.

Consider now, the fixed rate binary-coded-decimal counter of FIG. 7. Four flip-flops, 701, 702, 704, anr 708 are arranged in sequence corresponding to the 1-unit, 2-unit, 4-unit, and 8-unit stages of the decade and disposed with the least significant digit on the left. The clock pulse train is applied on lead 26 to the tied trigger input leads 701c and 701d of the 701 stage, and to the tied trigger input leads 702c and 702d of the 702 stage; in addition, input lead 26 is applied as the reset trigger lead input 708d of stage 708. The set trigger input lead 708c of stage 708 is taken from the 704g output lead of stage 704. Thus, whether or not a set trigger pulse is applied to the 708 stage through the set trigger lead 708c, depends upon whether or not the state of stage 704 is switching from the one to the zero logic level. Similarly, the tied input comprising trigger leads 704c and 704d of stage 704 is taken from the 702g output lead of stage 702.

The state of any of the 701, 702, 704, and 708 stages is determined by the left-hand output leads of those stages designated as 701g, 702g, 704g, and 708g, respectively.

Each one of the four stages is arranged as a binary counting stage in the manner of FIG. 4G in the sense that each output lead is applied back to the steering input. The logic table of FIG. 4E is, therefore, descriptive of their operation with the exception of stage 708 which, as indicated above, does not have its set and reset trigger input leads 708c and 708d tied together. For this reason, the truth table of FIG. 4H should be consulted to understand the operation of that stage.

Although each of the four stages is a counter stage substantially in the sense of FIG. 4G, some of the closed steering loops have additional logic components, and therefore switching conditions, included within the loops. Thus, in the set steering loop of stage 702, is a three-input NOR gate 751 whose output 752 is applied as an input to an inverter 753 (single input NOR gate). The output of inverter 753 is the set trigger input 702a. The inputs of the NOR gate 751 are the output lead 702g of the 702 stage, the output lead 701h of stage 701, and the output lead 708g of stage 708. In similar manner, the reset steering loop of stage 702 includes a two-input NOR gate 754 whose output lead 755 is the input to inverter 756, whose output in turn is reset steering lead 702b. The inputs to NOR gate 754 are the output lead 702h of stage 702 and the output lead 701h of stage 701. From the equations of FIGS. 4A and 4C, it may be seen that the sequence of a NOR gate followed by an inverter provide the logical OR function, i.e., with inputs A and B to the NOR gate, the output C from the inverter is equal to A or B.

The right-hand or reset steering loop of stage 708 similarly includes a NOR gate 757 followed by an inverter 758. The output from stage 708 to the next succeeding decade is from the output lead 708g.

Stage 701 is identical to the stage of FIG. 4G and, therefore, its operation is completely described by that portion of the truth table of FIG. 4E enclosed by the heavy line. Thus, every application of a clock pulse on lead 26 switches the state of stage 701 to the alternate state.

With the logic circuit of the decade arranged as in FIG. 7, fixed rate binary counting is performed with successive input pulses on lead 26 in accordance with the diagram of FIG. 6; thus, the permutations of states of the four stages of the counter of FIG. 7 for ten successive input pulses on lead 26 are as represented in FIG. 6. With the logic diagram of FIG. 4H and the circuit of FIG. 7, this fixed rate binary-coded-decimal decade is completely defined. However, in order to get a better sense of the circuitry so as to more readily comprehend the variable rate operation of the decade of FIG. 5, let us examine, in some detail, the operation of the logic components in the steering loops of stages 702 and 708 of FIG. 7.

Consider first stage 702. It may be noted that the clock train is applied to the tied trigger leads 702c and 702d from lead 26. If NOR gates 751, 753, 754, and 756 were not included in the steering loops then stage 702 would operate as a regular counting stage and would change state for each pulse applied on lead 26. However, as was discussed above and as can be seen from the 2-unit stage column of FIG. 6, the state of the 702 stage is not supposed to change state with every clock pulse but rather is supposed to change state for every other pulse in the clock train (except the tenth). The NOR gate circuitry in the loop insures this latter operation. It may be noted that the output lead 701h from the 1-unit stage 701 is applied as an input to both the NOR gates 751 and 754. With stage 701 in the zero state, the 701h output lead is in the one state and, therefore, a logic one signal is applied to both NOR gates 751 and 754. Of necessity, NOR output leads 752 and 755 are in state zero while the outputs from inverters 753 and 756 must, of necessity, be in state one. This means that the 702a and 702b steering inputs to the 702 stage are in the one state. Reference to the logic diagram of FIG. 4E shows that when the set and reset steering leads (A and B) are in the one state there cannot be a change in the state of that stage whether or not a pulse is present on the trigger input leads. Accordingly, stage 702 cannot change state with the application of the next clock pulse and the state of that stage remains the same. When, however, stage 701 changes to the one state, as it does with the application of the next clock pulse, then its 701h output lead will be in the zero state. An application of a zero logic signal to NOR gates 751 and 754 cannot, in itself, produce a one on the 702a and 702b steering leads. Consequently, the 701h output lead cannot block a change in state of the 702 stage with the application of the next clock pulse. Accordingly, the 702 stage does change state (barring the effect of the 708g output from stage 708 acting as an input to NOR gate 751) and stage 702 does change state in accordance with the requirements of FIG. 6.

The 2-unit stage column of FIG. 6, and the discussion above, indicate that an additional constraint must be placed on the 702 stage. Although it is true that stage 702 should change state for every other input pulse as the decimal number representation for that decade goes from 0 to decimal number 9, the fact remains that in going from decimal number 9 to decimal number 0, the 2-unit stage should not change state. Thus, the 2-unit stage for decimal numbers 8 and 9 must be in state zero, and it must also be in state zero for the decimal numbers 0 and 1. The output lead 708g from 8-unit stage 708, as shown in FIG. 7, is applied as an input to NOR gate 751. Looking at the permutations of states for decimal number 9 in FIG. 6, shows that the 1-unit stage is in state one. That means the 701h output lead from stage 701 is in state zero and consequently, cannot provide a signal to block the change of state of stage 702 with the next clock pulse unless something more is done. The permutation of states for decimal number 9, however, shows that the 8-unit stage is in state one. Therefore, the output 708g from stage 708 is in the one state and is applying a one along the 708g input lead to NOR gate 751. This means that the 702a steering input to the 702 stage must, of necessity, be in the one state. At the same time, with stage 702 in the zero state as required for the permutation representing decimal number 9, the 702h output lead of that stage is in the one state and, therefore, a one is applied on the 702h lead to the NOR gate 754. Consequently, a one signal is applied to the 702b reset steering input to that stage. With a one at the 702a and 702b inputs to the 702 stage, the next clock pulse cannot change the state of the 702 stage; it is completely blocked from changing states as the truth table of FIG. 4E demonstrates. As a result, changing from the permutation representing decimal number 9 to that representing decimal number 0 is effected properly in that the 2-unit stage remains in the zero state.

By way of brief recapitulation then, the NOR gates 751, 753, 754, and 756 in the steering loops of the 702 stage perform the function of insuring, firstly, that stage 702 does not change state for every clock pulse but rather changes state for every other clock pulse, and secondly, with output 708g from stage 708 coupled to NOR gate 751, it is insured that when the decade changes its representation from decimal number 9, stage 702 remains in its zero state (even though it would ordinarily change to a one state) so as to properly represent the permutation for decimal number 0.

NOR gates 757 and 758 in the reset loop of stage 708 are included for the purpose of insuring that that stage operates in accordance with the typical requirements of a binary-coded-decimal counter decade. If this were a pure binary counter, the application of a clock pulse when the decade represents decimal number 9 would not change the 8-unit stage since a binary counter represents numbers from 9 through 15. In a binary-coded-decimal counter, however, the application of a clock pulse to the counter when it represents decimal number 9 should switch it to a condition representing decimal number 0. Therefore, the 8-unit stage must be switched from a one state to a zero state in order for the counter to go from 9 to 0. This is the function of gates 757 and 758, i.e., to switch the 708 stage from a one state to a zero state after stage 708 has been in the one state for two successive clock pulses. Changing stage 708 from one to zero also, and simultaneously, provides an output pulse from stage 708 to the next succeeding decade in the chain, since a change in logic level from one to zero is a pulse out.

To understand how stage 708 is switched from state one to state zero after it represents decimal number 9, requires knowing the states of all of the input leads to the 708 stage while the decade represents decimal 9. Since trigger input leads 708c and 708d are not tied together, the operation of stage 708 is more complicated than that of stages 701, 702, and 704. However, the truth table of FIG. 4H describes completely the operation of the 708 stage. Consider the state of the input leads to stage 708 when stage 708 is in state one and the entire decade represents decimal number 9. Under these circumstances the 708g output lead and, therefore, the 708a steering lead are both in the one state. The 708h output lead is necessarily in the zero state and so a zero is applied on the 708h lead to the input of NOR gate 757. However, the second input lead to NOR gate 757 is in the 701h lead. Since stage 701 is in state one, lead 701h is in state zero. Accordingly, with both inputs to NOR gate 757 being zero, output lead 759 is in the one state. The output of inverter 758, and the 708b reset steering lead, are therefore in the zero state. No pulse is applied to set trigger lead 708c since it is derived from output lead 704g of stage 704. Since stage 704 did not change state for two successive pulses, it cannot be applying a pulse to the set trigger input 708c. The reset trigger input 708d to stage 708, is, however, the clock pulse train input lead 26 and, accordingly, a pulse is present on that lead. Thus, the state of all the input leads to the 708 stage are as follows: 708a is in state one, 708b is in state zero, 708c has no pulse applied, and 708d does have a pulse applied. Under this set of conditions, reference to the truth table of FIG. 4H demonstrates that stage 708 must change state from one to zero. Since state 708 changes from one to zero, and stage 702 as previously described does not change from its zero state, the permutation representing decimal number 9 is converted to the permutation representing decimal number 0.

Figure 8:
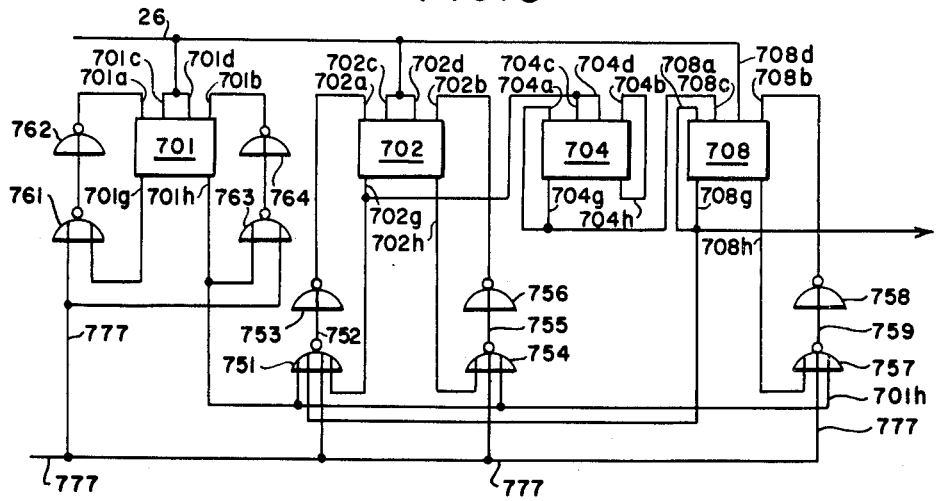

FIG. 8 is a replica of the decade of FIG. 7 except that NOR gate 761 and inverter 762 have been inserted in the set steering loop of stage 701, and NOR gate 763 and inverter 764 have likewise been inserted in the reset steering loop of stage 701. Additionally, a counter steering pulse input line 777 is applied as a second input to NOR gate 761 and as a second input to NOR gate 763. This lead is additionally applied as an input to NOR gates 751 and 754 of the set and reset steering loops of stage 702 and to NOR gate 757 in the reset steering loop of stage 708. Since the arrangement of inverter 762 relative to NOR gate 761 is such that the inverter takes its input from the output of the NOR gate, and similarly for inverter 764 and NOR gate 763, the operation of these logic components is analogous to the sets of NOR gates and inverters described relative to FIG. 7.

The circuit of FIG. 8 operates exactly the same as that of FIG. 7 when the input lead 777 has applied thereto a logic state zero signal. When a logic state one signal is applied on lead 777, however, the entire decade is blocked from counting, i.e., the decade does not count at all even though clock input pulses are being applied to the decade on lead 26. That this is the case may be readily seen by viewing the three stages that could conceivably change their states with the application of a clock pulse on lead 26. It may be recalled that clock pulses are applied on lead 26 to the 701c and 701d trigger inputs of stage 701, to the 702c and 702d trigger inputs of stage 702, and to the 708d reset trigger input to stage 708. If none of these three is to change state with the application of a clock pulse then each of the three must be blocked by the logic one signal applied on lead 777. In the case of the 701 stage this obviously happens. The lead 777 is applied as inputs to the NOR gates 761 and 763; with a one on these inputs the outputs of the NOR gates must be zero. These are followed by the inverters 762 and 764, so that the outputs of these inverters and, therefore, the 701a and 701b steering leads are at logic state one whenever the input lead 777 is at logic state one. It may be recalled that having a one signal on both steering leads completely blocks any change in state of that stage. With a zero input on lead 777, however, the NOR gate 761 and 763 as well as the inverters 762 and 764 act as if they did not appear in the circuit. The application of a logic one signal on input lead 777 to the NOR gates 751 and 754 coupled to stage 702 performs exactly the same function as those described immediately above relative to stage 701. Consequently the 702 stage is blocked with the application of a one signal on the 777 lead.

In the case of stage 708, the only times when it is ordinarily possible for the 8-unit stage to change state, is when the decade is changing from decimal number 7 to decimal number 8, and when it is changing from decimal number 9 to decimal number 0. At all other times, the 708 stage remains in the state at which it was before the preceding clock pulse. From the earlier description of the decade of FIG. 7, it may be recalled that the logic states for the various inputs to stage 708 as it is about to switch from its decimal number 7 to decimal number 8 condition, and as it is about to switch from its decimal number 8 to its decimal number 0 condition, are such that it can switch under those circumstances if, and only if, a logic state of zero exists at the 708b input. However, with a logic one input to NOR gate 757 from the input lead 777, the 708b input lead must, of necessity, be at logic state one. This means that stage 708 cannot change its state, i.e., cannot change from a zero to a one state, while the decade is representing decimal number 7 and cannot change from a one to a zero state when the decade is representing decimal number 9. Thus, the added circuitry in the FIG. 8 either permits the decade of FIG. 8 to count regularly as does the decade of FIG. 7, or it prevents it from counting at all dependent upon whether there is a logic zero signal or a logic one signal on input lead 777.

Referring now to FIG. 5 and the first decade 95 thereof, it may be seen that all of the circuitry of FIG. 8 is incorporated in decade 95, and additional circuitry is included so that the decade may operate as a variable rate counter in accordance with the principles of the invention. That which appears in decade 95 of FIG. 5 which is absent from FIG. 8 is as follows: a NOR gate 781 is associated with the set steering loop of stage 702 in that the output of the three input NOR gate 781 is applied as a second input to the NOR gate 753 previously described. In FIGS. 7 and 8 the NOR gate 753 operated exclusively as an inverter. Now, with the additional input 782 from the output of NOR gate 781, NOR gate 753 operates as a two input NOR gate. Similarly, in the reset steering loop of stage 702 is a two input NOR gate 783 which has its output 784 applied to the NOR gate 756 in the same manner as was described for NOR gate 781. A two input NOR gate 785 is associated with the reset steering loop of stage 708 in a similar manner, in that the output 786 of NOR gate 785 constitutes a second input to the previously described NOR gate 758. A third input to the decade, i.e., in addition to leads 26 and 777, is lead 778 which constitutes an input to each one of the three NOR gates 781, 783, and 785. The NOR gate 781 additionally has two more input leads; the first is 708g which is from the 708 stage; and the second is 702g from the 702 stage. The second input of NOR gate 783 is 702h while the second input to NOR gate 785 is 708h.

Depending upon the logic states of the input leads 777 and 778, decade 95 either counts the clock pulses coming in on lead 26 straightforwardly one at a time, or does not count the clock pulse coming in at all, or registers a count of two for the clock pulse coming in on lead 26.

More specifically, the decade provides:

A normal count by one when lead 777 is in the zero state and 778 is in the one state;

A count of zero when lead 777 is in the one state and lead 778 is in the one state;

A count of two when lead 777 is in the one state and lead 778 is in the zero state.

The circuitry in decade 95 of FIG. 5, over that shown in FIG. 8, operates with the circuitry of FIG. 8 to produce its effect. Consider first that variable rate decade 95 is to count normally, i.e., a count of one for each clock pulse. This occurs when lead 777 is in state zero and lead 778 is in the one state. Why this is so may be seen from looking at the NOR gates 781, 783, and 785. Each of these NOR gates has an output of zero and, therefore, leaves the respective succeeding NOR gates 753, 756, and 758 unaffected when the input to each of the NOR gates 781, 783 and 785 is a one. Therefore, a one applied on input 778 assures that no new factors are interjected into the circuit above what were considered in connection with FIG. 8. Secondly, consider that decade 95 is to count by zero for each clock pulse (as will be recalled from FIG. 8, this occurs when lead 777 is in the one state). For the same reasons as described immediately above, putting the input lead 778 into the one state assures that it in no way affects the logic arrangement of the decade and so the lead 777 logic state of one controls the decades and blocks its operation.

It is when the 778 input is equal to zero, however, that decade 95 can and will count by two rather than by one or zero. Lead 777 under these circumstances, must be one for the purpose of making sure that the decade is blocked from counting in its normal one count, and the count by two circuitry can take over. It may be recalled that the binary-coded-decimal counter counts by two when the decade is in the decimal 0 through decimal 7 logic conditions, inclusive (see FIG. 6), merely by changing the state of the 2-unit stage 702. The state of stage 702 can change if, and only if, leads 702g and 702a are in the same state as each other, and leads 702h and 702b are in the same state as each other (under the assumption, of course, that input lead 777 is in state one). The state of zero on lead 778 is applied to stage 702 circuitry through NOR gates 781 and 783. It is this state of zero which is responsible for making the states of 702g and 702a equal to each other and the states of 702h and 702b equal to each other so that an, input trigger pulse on 702c can change the state of that stage.

Consider the set steering loop of stage 702 under the assumption that 702g is in the zero state. Under these circumstances the input lead to 781 and 702g is zero; the input lead 778 to NOR gate 781 is zero since that is the count by two state of the 778 lead; the 708g input lead to NOR gate 781 will also be zero since decade 95 is representing a decimal number from 0 to 7, inclusive, and this requires that the 708 stage be in its zero state. With the three inputs to NOR gate 781 in the zero state, the output of the NOR gate must be one. Consequently, input lead 782 to the succeeding NOR gate 753 is in the one state and the output lead of NOR gate 753, which constitutes the set steering lead 702a, must be in its zero condition. Thus, if 702g is in its zero state, then 702a must also be in its zero state due to the action of the NOR gate 781 with the presence of a zero signal on the 778 lead. Now, consider the set steering loop under the assumption that 702g in its one state. Lead 702g applies a one to both the NOR gates 781 and 751. This means that each of the outputs 782 and 752, respectively, are in the logic zero state. NOR gate 752 receiving two zero inputs must have a logic one output on the 702a lead. Consequently, lead 702a must be in the one state when lead 702g is in the one state. In this way, the circuitry insures that the 702a set steering input lead is always in the same state as the 702g output lead whenever input lead 777 is in the one condition and lead 778 is in the zero condition. In exactly the same manner, the circuitry of the reset steering loop of stage 702 operates to insure that reset steering input lead 702b is always in the same state as the 702h lead. In this way, variable rate decade 95 always has its 2-unit stage switched with a clock pulse with the appropriate combination of 777 and 778 input conditions when the entire decade represents any decimal number from 0 through 7, inclusive.

When decade 95 represents decimal number 8, or decimal number 9, however, counting by two requires that the 8-unit stage 708, rather than the 2-unit stage, change its state with a clock pulse. The circuitry added by virtue of the NOR gate 785 in the reset steering lead of stage 708 is responsible for providing this result. Looking at NOR gate 757, it may be seen that one of the inputs is lead 777 which is in the one state for the count by two operation. This means that output lead 759 of NOR gate 757 must be in its zero condition. NOR gate 785, on the other hand, has two inputs both of which are in the zero state, i.e., input lead 778 is in its zero state appropriate for the count by two conditions and input lead 708h is necessarily in the zero condition since the 708 stage must be in the one condition in order to represent decimal number 8 or 9. Accordingly, the only two input leads to NOR gate 785 are in the zero condition and, therefore, the output lead 786 thereof is in the one condition. NOR gate 758, receiving its input from NOR gate 785, has a logic one applied thereto on its input lead 786. Accordingly, the output of NOR gate 758 must be zero. It may be recalled that the 708c input for the decimal 8 or 9 representation has a pulse absent condition; the 708d input has a pulse present condition due to the clock pulse applied; the 708a input must necessarily be in the one state since the 708 stage is in the one state. These three conditions, with the impressed condition that 708b must be in the zero state as a consequence of the action of NOR circuitry 785 and lead 778 being in the zero state, means that the clock pulse on lead 26 must switch the state of the 708 stage. It is readily verified that if the lead 778 were in state one, the net result would be that lead 708b would be in the one state; reference to the truth table of FIG. 4H demonstrates that this would result in the failure of stage 708 to change state.

Since lead 777 is in the one state for this count by two operation, we are assured that no other of the stages 701, 702, 708 can possibly change state since the effect of 777 being in the one condition is to block the operation of those stages. Accordingly, we are assured that with this combination of inputs only the 708 stage changes state with a clock pulse. In this way, decade 95 of FIG. 5 counts by two for every clock pulse input irrespective of which decimal number the decade is then representing.

Various factors enter into determining the logic states of leads 777 and 778. Let the letter "U" represent the logic state of lead 777 and the letter "V" the logic state of lead 778. This means a normal count of one is provided for $U=0$ and $V=1$; a count of zero is provided when $U=1$ and $V=1$; and a count of two is provided when $U=1$ and $V=0$. The logic value of V is dependent upon the following factors: whether or not the distance counter 42 (see FIG. 2B) is applying a blocking output signal on lead 93; and whether or not an enabling signal has been generated from the numerical data equipment 21 on lead 22 indicating that the transfer of new data from the buffer storage registers to the active storage registers throughout the control section has been completed. Effectively, a flip-flop (not shown) receives an indication as to whether or not the distance counter has commanded a discontinuance of the application of the pulse train from the function generator 37 on lead 43 to the phase counter. This flip-flop is set to state zero by the application of the signal from the distance counter indicating that the path cut has been completed and the pulse train from the function generator should no longer be applied to the command phase counter. When, however, a new block of data has been transferred into the active storage for the next operation, then the flip-flop has its state changed so that the pulse train from the function generator may be applied and used at the command phase counter. If we represent the state of the flip-flop by the letter "K," then K is equal to zero when the distance counter indicates a block signal, and it is set to one when the transfer of new data to the active storage registers has been completed.

Since the counting by zero or by two can only occur when a pulse is applied (which is part of the pulse train whose rate represents commanded velocity) from function generator 37 to the command phase counter 31, both U and V are functions of the appearance or lack of appearance of a pulse on lead 43. The logic state on lead 43 going to the phase counter is represented as variable "L." When L is equal to zero, there is an output from function generator 37 and when it is in the one state there is no output. Both binary variables U and V are dependent upon a synchronizing signal "M."

Since the output pulse of the function generator is a logic state of one or zero maintained for the interval spanned by one computing clock interval which spans a predetermined number (such as 5) of clock pulses on lead 26, each such output pulse is synchronized with a synchronizing signal M to count fast or slow by only one count for each function generator output pulse. This M synchronizing signal is a signal at zero state for one main clock interval preceding each computing clock signal and at state one for other times. This synchronizing signal thus permits only one count up or down (instead of 5) for each function generator output pulse. The M synchronizing signal is derived from states of the divider counter 30 of FIGS. 2A and 2B which generates the lower frequency computing clock signal.

The last binary variable upon which U and V are dependent, is the direction signal "P" which is the positive or negative sense of motion signal derived from the programmed input data. A negative direction signal conforming to a binary one for down-scale counting results in variable rate counter 95 omitting a clock pulse when a clock pulse is applied on lead 26, while a positive direction signal in the form of a binary zero results in the counter counting two for each clock pulse.

From this the binary logic states of U and V and, therefore, of leads 777 and 778 are completely defined relative to the rest of the system shown in FIG. 2B by the following two equations:

(1) $\qquad U=K\cdot \overline{M} \cdot \overline{L}$ (2) $\qquad V=K \cdot \overline{M} \cdot \overline{L} \cdot \overline{P}$ Equation 2 defines the conditions required for the counter to count by two, i.e., for $V=0$, while Equation 1 defines the conditions required for the counter to be blocked from fixed rate operation and, therefore, either count by zero or by two, i.e., $U=1$.

Figure 9:
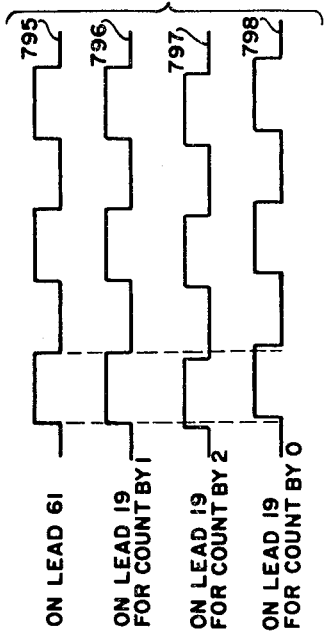
FIG. 9 is a timing diagram of the waveforms produced by the command phase counter of FIG. 5 for certain illustrative operating conditions.

Throughout the operation of the entire system shown in FIG. 2B, the command phase counter 31 continuously operates and frequently cycles at a variable rate. At all times that the control section is operative there is a pulse output from the command phase counter on lead 19, the phase of which is a function of the summation of the zero count and two count operation of the variable rate decade 95. If the variable rate decade were never commanded to count other than in the normal progression of ones, then the output of the phase counter would be a 250 cycle per second square wave precisely in phase with the 250 cycle per second output from the divide by 1000 pulse rate divider 28 on lead 61. In FIG. 9, curve 795 shows the 250 cycle per second reference square wave out from pulse rate divider 28. Curve 796 shows a 250 cycle per second square wave out from the command phase counter on lead 19 under the condition that the counter has always operated as a normal fixed rate counter. Curve 797 shows the output of the command phase counter when one of the input clock pulses has been counted as two pulses. The phase of curve 797 is slightly in advance of curve 795. Since for one input clock pulse the phase counter counted two output pulses, it follows that the leading edge of the first output pulse (of curve 797) from the last decade of the phase counter will be provided after 999 input clock pulses rather than after 1000 clock pulses as would ordinarily be the case if the phase counter counted exclusively by one. Accordingly, the phase lead of curve 797 over that of 795 is equal to one-thousandth of a cycle of the 250 cycle per second pulse train curve 795. Similarly, curve 798 shows the situation for the output of the phase counter when the counter has counted a zero for one of the input clock pulses. Here the curve 798 lags that of curve 795 slightly. It is approximately one-thousandth of a cycle behind that of curve 795 since the command phase counter had to count one thousand and one input clock pulses before it provided the leading edge of its output pulse. If the velocity command signal from the function generator applied along lead 43 to the command phase counter through appropriate logic arrangements is a pulse train at a steady rate, the phase of curve 797 (or 798 dependent upon whether the velocity is to be in a positive or negative direction) continuously changes relative to curve 795, and at a steady rate. This is because the command phase counter is being told to count two for specified input clock pulses at a fixed rate. Thus, for example, it may be that the frequency of the function generator output pulses is such that it tells the command phase counter to count two pulses for every 25 input clock pulses. Under those circumstances, the phase will change one-thousandth of a period after every 25 input clock pulses. This steady rate of phase shift in the output will change if the pulse rate from the function generator changes. If it does change, the rate of phase shift out from the phase counter will also change.

Throughout the entire operation of the control section of the numerical contouring control system, the command phase counter operates continuously and cyclically and, therefore, need not be reset. However, when the numerical control system is initially started up, it is appropriate to set all of the flip-flops in the command phase counter to the zero state and then start it counting in synchronism with the reference counter. This is readily done by a manual reset lead (not shown) applied to all of the flip-flops in manner well known in the art.

THE MULTIPLE TOOL OFFSET CORRECTION SYSTEM—IN GENERAL

FIG. 10 is a general block diagram of the tool offset correction system adapted to provide the offset correction for the Y or cross-feed direction (along cross-hair 117 of telescope 116 of FIG. 1B) in the Y channel only of the numerical contouring control system. The lower portion of FIG. 10, given as part of the environment of the offset correction system, comprises function generator 37, pulse clock 23, pulse rate divider 28, command phase counter 31, and the Y coordinate servomechanism loop as taken from the block diagram of FIG. 2A.

The top portion of FIG. 10 represents a general block diagram of the tool offset correction system for the Y channel. Thus, the major point of juncture of the offset correction system and the numerical contouring control system is at the point where logic block 331 of the offset correction system provides an output which constitutes an input to Y axis command phase counter 31 of the numerical contouring control system. Additional communication is provided from the contouring control system to the offset correction system by virtue of utilization of various timing pulse trains from pulse clock 23 and pulse rate divider 28. Offset correction for the X channel is provided by a duplicate of the offset correction system shown, which joins the numerical contouring control system at the command phase counter for the X axis control channel.

The tool offset sequencer 300 is the master control for the entire offset correction operation. It includes as a major portion, a one decade, count-down, binary-coded-decimal counter, hereinafter referred to as the sequence counter. This counter is set into operation from its decimal zero or quiescent state, by a start signal on input lead 305. The start signal is ordinarily initiated by information from the input tape through the numerical input equipment 21 of FIGS. 2A and 2B. Such a signal is provided when the punched tape program calls for a particular cutting tool to be used for the next successive cut. The start signal on lead 305 may additionally be provided in manual or semi-automatic operation by a switch which similarly provides a start signal. The start signal is maintained throughout the entire offset correction process.

The length of the offset correction process is equal to the total length of time it requires the count-down counter of offset sequencer 300 to count down through an entire decade, that is, to count from decimal zero through nine, eight, and so on back to zero. Once the binary-coded-decimal decade has sequenced through the ten steps back to decimal zero, a zero recognition circuit provides an output stop signal on lead 306, which in turn halts the operation of the count-down counter, signalling the end of the offset correction process, and maintaining the sequence counter in its decimal zero state.

For each decimal digit through which the sequence counter passes, certain specific operations are carried out throughout the rest of the circuitry of the offset correction system, as will be explained.

From a broad point of view, the outputs of the offset sequencer may be considered as interrogation, conditioning, and command signals to the other sections of the offset correction system. Thus, output leads 301, 302 and 303 apply input interrogation signals to the operator's tool offset decimal switch array 309. Input leads 311, 312 and 313 to decimal switch array 309 are obtained from numerical input equipment system 21, deriving information and signals from the programmed punched tape. Specifically, the signals applied on leads 311, 312 and 313 indicate which if any of the three cutting tools is called for by the program. Thus, a signal on input lead 311 indicates that the first cutting tool 111 is called for, on lead 312 the second cutting tool 112 is called for, and on lead 313 the third cutting tool 113 is called for. The simultaneous occurrence of a particular tool signal on one of those three leads (and only one tool can be called for at a time) with the interrogation signals sequentially applied on leads 301, 302 and 303, results in an interrogation of the Y offset switch in array 309 for that particular cutting tool. Assuming it is lead 311 to which the tool signal is applied, the first cutting tool is called for and therefore data from the first set, and only the first set, of decimal switches is read out as a result of the interrogation by signals on leads 301 through 303. At the same time, the direction or sign of the offset correction is applied as an output on lead 315 from switch array 309. The number read out is converted from its decimal form to a binary-coded-decimal representation in the decimal-to-binary-coded-decimal radix converter 317. Thus, the interrogation by offset sequencer 300 of offset switch array 309 in conjunction with the instruction from the punched tape as to which tool is to be used, generates a set of signals on lead 319 out of radix converter 317 which represent the magnitude (and on lead 315, the direction) of the offset correction for the Y axis.

This binary-coded-decimal representation of the magnitude of the offset correction is utilized to preset a three decade binary-coded-decimal count-down counter which is the tool offset counter 321. However, offset counter 321 is preset in accordance with the number on input line 319, only when permitted so to do by tool offset sequencer 300. Thus, interrogation leads 301 through 303 are also applied as input leads to offset counter 321 in conjunction with input leads 324 and 325 from sequencer 300 and pulse rate divider 28, respectively. These input leads function to apply conditioning signals to offset counter 321; the offset correction number applied on lead 319 can be preset in offset counter 321 solely when these conditioning signals are applied from the offset sequencer and pulse rate divider.

Offset counter 321 comprises three decades, thereby being capable of counting a total of 999 pulses. This is appropriate, since offset switch array 309 is adapted to provide an offset correction number, for presetting offset counter 321, having a magnitude up to 999. This means that a total of 999 pulses may be added or subtracted in Y axis command phase counter 31. It may be recalled that synchro resolver 16 under control of command phase counter 31, is adapted to be rotated one complete revolution for every one thousand command pulses applied to the command phase counter. In addition, one complete revolution of the synchro resolver 16, because of the gearing in the mechanical coupling to the machine tool included in the servo loop, provides a total linear motion of the machine tool equal to one-tenth of an inch. Therefore, when the decimal switch set in offset decimal switch bank 309 is set by the operator to some particular number between zero and 999, that number multiplied by .0001 of an inch equals the total offset correction which has been fixed for that cutting tool in the Y coordinate.

A multi-function logic system 331 has applied thereto as input offset sign lead 315 from switch array 309, a set of sequence command output leads 333 from tool offset sequencer 300 and a zero recognition output lead 335 (actually three leads) from offset counter 321.

The logic system 331 has two major functions. The first is to permit, by virtue of appropriate phase control signals on its output lead 339, command phase counter 31 to count two pulses, or no pulse, for every input clock pulse applied to the command phase counter on lead 26 from 250 kilocycle clock 23. Whether a zero or a two is counted for each clock pulse when superposing a new offset correction upon the output of the command phase counter is dependent upon whether the offset correction direction is to be positive or negative, and thereby dependent upon the binary state of the sign signal on lead 315 from switch array 309. The total number of pulses for which this double or subtract one count is performed in the command phase counter under the control of logic block 331 is equal to the number preset into the offset counter 321. The manner in which this is arranged will be explained in greater detail below; but briefly, the preset number in offset counter 321 is gradually counted down to zero as a consequence of the application of 250 kilocycle per second clock pulses as another input to the offset counter on lead 341 from the pulse clock 23. Thus, offset counter 321 counts down to zero from a preset number at precisely the same rate as the pulses applied to command phase counter 31 are being counted as either double pulses or no pulse at all. In short, whenever offset counter 321 is counting down, logic block 331 is varying the count rate and output phase angle of command phase counter 31. Once, however, the offset counter has counted down to zero, and as a consequence, the output phase angle of the command phase counter has been changed to the appropriate magnitude for effecting the offset correction of the cutting tool, a zero recognition signal is applied from each of the three decades of the offset counter 321 to logic block 331. In turn, there are eliminated from lead 339 any control signals that would cause the command phase counter to count in other than its normal mode. Thus, logic block 331, on receiving recognition that all of the offset counter decades have counted down to zero, permits command phase counter 31 to count in its normal mode, i.e., one count for every pulse from 250 kilocycle per second pulse clock 23.

The second major function of the logic block 331 is to provide an output signal on lead 343 which constitutes another input to offset counter 321 for the purpose of initiating the count-down action of the offset counter. When the offset counter is not in the process of counting down, it may either be in its decimal zero state, on the one hand, indicating a count-down has just been completed or that the reference tool 111 (having no offset correction) was last in position; or it may be preset to some number other than zero, on the other hand, at a time in the sequence of the offset sequencer wherein some operation other than counting down of the offset counter is required. The latter situation may well be one wherein the number in the offset counter represents the number of the offset provided by the tool now in use and indicates that this offset is now incorporated and superposed upon the phase angle output of the command phase counter. Not until some time in the future, when that offset correction is to be removed in order to make way for a new offset correction, will it be necessary or appropriate to count down that number from the offset counter. Accordingly, the state of output lead 343 determines whether or not the offset counter is counting down at any particular time.

To more fully appreciate the general concept of the tool offset correction system generally represented in FIG. 10, let us briefly consider the operation of the system for a particular tool offset at a particular point in a contouring program. Assume that the contour shown in FIG. 3 is to be cut and that at point B, i.e., between the A–B cut and the B–C cut, a tool change is programmed. Thus, let us assume that the reference cutting tool 111 of FIG. 1C is utilized for the A–B cut and at point B, cutting tool 113 of FIG. 1E is programmed to be utilized for the B–C cut. The program for the contour of FIG. 3 is presented above in the Table 1 Program Manuscript. Our interest is restricted exclusively to that part of the program for the two successive cuts A–B and B–C with the additional blocks of instructions now to be included for the tool change. Such a program for these two successive cuts with the included tool change may be as represented in Table 2 immediately below.

Reference to FIG. 1E indicates that a +.0791 of an inch correction in the Y or cross-feed direction is required for tool 113. This means that +791 has been set into the tool offset decimal switch array 309 for cutting tool 113 set of switches.

The program requires, for the cut from A to B as shown in FIG. 3, nothing unusual, and assuming that the reference cutting tool 111 is in operation at the time the cutting edge reaches point B, tool 111 is retracted by the next block of instructions and then the tool selection of tool 113 indicated by T3 in the tool selection column of the program may be performed. At the time tool selection for T3 is accomplished between the two successive cuts, the numerical contouring control system goes into a mode of operation indicated by the g4 program instruction indicated in the program selection column.

The g4 program selection, not before discussed, is an operation in the numerical contouring control process wherein the cutting element remains at one point relative to the work piece for a period known as the dwell time. During this period various functions may be performed such as changing lubricants, or changing the tool as is the case now under consideration. The dwell time is measured out in units of time and controlled in the program as shown in Table 2 by the X instruction in the X departure column. The instruction x+0.3000 indicates a dwell time of three seconds. The dwell time is readily accomplished in manner well known in the art by utilizing the X distance counter to count out pulses, not as a measure of distance along the cut, but as units of time when g4 is programmed. Thus, an input pulse train is applied to the X distance counter having a pulse rate of 1,000 pulses per second. Accordingly, when the distance counter counts out 3,000 pulses, a time of three seconds has elapsed. In this way, a three second dwell time is obtained. It may be noted that there is neither a Y departure nor a feed rate number included in the block of instructions involving tool selection. Obviously, feed rate is inapplicable, since the cutting element is not moving along a contoured path or cut. Similarly, Y departure is not programmed, since there is in fact no departure at all and the X departure column is merely utilized as a timing instruction to count out the dwell time. The important restriction on the amount of dwell time is merely that it must be sufficiently long such that the tool may be physically changed and an entire change in the offset correction system may be completed. It will be seen that a complete change in the offset correction system may be accomplished in a period equal to one twenty-fifth of a second.

On reaching point B in the contour FIG. 3, therefore, after tool retraction the g4 instruction in the program commences the dwell time while the T3 instruction through the input numerical data equipment 21 (FIG. 2B) applies the start signal on lead 305 (FIG. 10) to the tool offset sequencer 300 and at the same time applies the T3 switch conditioning signal on lead 313 to offset switch array 309 for tool 113. The start signal on lead 305 to sequencer 300 initiates the down counting of the offset sequence counter.

The first step in the sequence involves counting down the number in offset counter 321, which represents the tool offset correction presently in the system. Simultaneously, command phase counter 31 is caused to vary its count so as to remove this offset correction from the con-

TABLE 2.—OFFSET PROGRAM

| From Data Point | To Data Point | Program Selection | X Departure | Y Departure | Feed Rate Number | Tool Selection |
|---|---|---|---|---|---|---|
| A | B | g1<br>g1<br>g4 | x+5.0000<br>x+0.0000<br>x+0.3000 | y+0.0000<br>y+0.2000 | f020<br>f199 | T3 |
| B | C | g1<br>g1 | x+0.0000<br>x+6.0000 | y−0.2000<br>y−1.7500 | f199<br>f016 | | touring control system. When offset counter 321 has counted down to zero, it has been placed in condition to receive a new offset correction number. Since it is assumed for this explanation that reference cutting tool 111 (requiring zero correction) was used for cut A–B of the contour, the offset correction number, stored in offset counter 321 at the time tool selection T3 goes into effect, is decimal zero. Accordingly, there is no offset correction to be removed from the phase angle of the output of command phase counter 31.

Having removed the old offset correction in counting down offset counter 321 to zero, the next step in the sequence of the offset sequencer is to require the setting of each stage of each of the three decades of offset counter 321 to its binary one state. This setting process is an operation preparatory to presetting the offset counter for the new correction.

The offset sequencer 300 interrogates sequentially, by means of its output leads 301 through 303, the decimal switch array 309. This is done by applying an appropriate signal on lead 301 which interrogates the most significant digit switch for all three cutting tools. Since a conditioning signal is applied by the T3 program only to input lead 313, the most significant digit of the Y offset correction for cutting tool 113 provides an output from array 309 to the decimal-to-binary-coded-decimal converter 317. Thus, the most significant digit interrogation results in the decimal digit 7 being read out of switch array 309, and converted to binary-coded-decimal form in converter 317.

This coded number is used to preset the most significant digit decade of offset counter 321 such that it represents decimal number seven. Since all of the stages of offset counter 321 had previously been set to logic state one, this presetting is accomplished by changing the appropriate stages in that decade from binary one to binary zero to obtain the binary-coded-decimal representation of decimal digit 7.

The remaining decimal digits of the offset correction number, i.e., 9 and 1, are preset into the two remaining decades of offset counter 321 in the same way, but using signals on leads 302 and 303, respectively. At this point, then, the Y offset correction number 791 of cutting tool 113 as stored in switch array 309, has been preset into offset counter 321. This is the new Y offset correction that is to be introduced into the system through the command phase counter. At the same time that this occurs, the direction of the offset correction is applied as an output from switch array 309 on lead 315 to condition logic circuitry 331 such that the 791 pulses that are to be applied to the command phase counter are applied in the appropriate way, i.e., so that the command phase counter counts a double count for each one of those 791 pulses and the output phase angle is advanced to provide the required positive Y correction.

The next step in the sequence is initiated by an output from offset sequencer 300 on a lead of the group of leads 333, which serves as a sequence command applied to logic block 331. This signal initiates the 791 double-counts in the command phase counter. Simultaneously, output lead 343 of logic block 331 applies a conditioning signal input to offset counter 321 such that it commences counting down from its preset number 791 toward zero at a 250 kilocycles per second pulse rate which is applied on input lead 341 from pulse clock 23. Since offset counter 321 counts down at that rate, and command phase counter 31 performs its double-counts at that rate, the phase angle change in the output of the command phase counter is completed at the time offset counter 321 has counted down to decimal zero. When this happens, decimal zero recognition circuits in offset counter 321 apply output signals which, through logic section 331, discontinue the double count in the command phase counter.

The next sequence dictated by sequencer 300 involves setting each stage of each decade of offset counter 321 to the binary one state. The three succeeding sequence steps repeat the interrogation switch array 309 to preset offset counter 321 once again with the offset correction number just introduced into the system. This rewriting of the T3 Y-axis offset correction into the offset counter permits the subsequent removal of this offset correction from the contouring control system when the next tool is ordered by the program.

When offset counter 321 has thus once again been preset, offset sequencer 300 has reached the very last step of its sequence and the sequence counter has returned to its decimal zero state. A zero recognition circuit in the sequence counter, recognizes this condition, and applies a stop signal on output lead 306 which is reapplied, at the same location in the sequencer as start signal lead 305, to halt the operation of the sequencer. At this point, then, the offset correction (described only for the Y coordinate) is completed. At the end of the three second dwell time and return of the tool, then, as required by the program shown in Table 2, the next cut from B to C is carried out. Cutting tool 113, however, will have been moved into place by appropriate drive mechanisms (not shown), and in accordance with the required offset correction such that the cutting edge would be directly in register with the cross-hair intersection if brought into the original reference tool setting position under the operator's sighting scope.

With the general description of the offset correction system in accordance with the block diagram of FIG. 10 thus presented, it is appropriate to turn to the detailed logic circuitry of the system. In this circuitry, reference will be made to count-down counters both in offset sequencer 300 and in offset counter 321. The count-down counter of offset counter 321 has three decades and the offset sequence counter has one. Therefore, the logic circuitry of a count-down decade will now be presented in detail so that it need not be repeated in the description of the logic diagrams of FIGS. 12 through 15.

Figure 11:
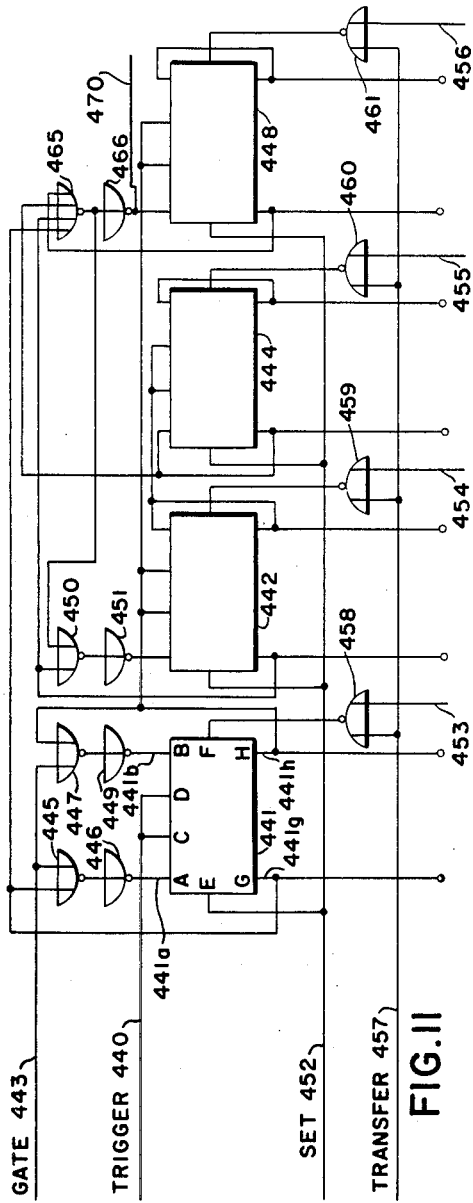
FIG. 11 is a logic circuit diagram of a binary-coded-decimal down counter used in the preferred embodiment of the tool offset correction system.

In FIG. 11 there is shown a four stage binary-coded-decimal count-down counter decade utilized for offset counter 321. It includes all of the leads, and more, required in the count-down sequence counter decade of offset sequencer 300. The gated count-down counter shown in FIG. 11 is a binary-coded-decimal counter having a 1-2-4-8 weighting pattern, and is arranged to count decimally from nine to zero, and re-cycle to nine. Four flip-flop stages, 441, 442, 444, and 448 are used in this counter. It is triggered by positive clock pulses applied on lead 440 to trigger inputs 441c and 441d of the first flip-flop 441. An enabling gate signal is applied on lead 443 to steering NOR gates 445 and 447. The second input to these NOR gates is applied respectively by output terminals 441g and 441h. Inverters 446 and 449 connect the outputs of NOR gates 445 and 447 respectively to input steering leads 441a and 441b of flip-flop 441. This flip-flop 441 changes state each time a logic zero appears on gating lead 443 and a clock pulse appears on trigger lead 440. Unless input lead 443 has a logic zero condition thereon, no count is registered.

Assuming all stages 441, 442, 444 and 448 are initially in the zero state, when flip-flop 441 is switched to the one state, the output pulse appearing on lead 441h is applied as a triggering pulse to flip-flops 442 and 448. Four-input NOR gate 465 provides a discrete logic one output only when all four stages are in the zero state. This is inverted by inverter 466 to provide a logic zero to steering input A of flip-flop 448. Simultaneously, this logic one output is applied as an input to NOR gate 450, insuring a logic zero output therefrom, producing a logic one on steering input A of flip-flop 442, due to the intervention of inverter 451. These signals permit the trigger output from flip-flop 441 to trigger flip-flop 448 while blocking a similar triggering of flip-flop 442. In response to the first input pulse, therefore, the decade resides in a decimal nine condition (1001, in binary-coded-decimal notation). Following the 1–2–4–8 pattern, down counting in response to succeeding input gate and triggering pulses continues in conventional manner.

To register a number in the count-down counter, a logic one is first applied to set lead 452. This lead is connected to all electronic set inputs E and consequently all flip-flops assume the logic one state. Following set, the individual stages are preset in accordance with the complement of the binary values on leads 453–456 by applying a logic zero to transfer lead 457. NOR gates 458–461, connected to electronic reset terminals F implement this gating in an obvious manner. A third input is applied to each of the four transfer NOR gates 458–461 by virtue of input lead 472. Thus, the presetting of any flip-flop to the zero state from its set one state can occur only if the logic state on input lead 472 is also zero. Accordingly, presetting any flip-flop in its zero state can occur if, and only if, both leads 457 and 472 are in logic state zero. The state of each stage 441, 442, 444 and 448 may be sensed and utilized elsewhere via the leads connected to the respective "G" and "H" output terminals thereon.

When each of the four stages of the decade of the counter is in its logic zero state, recognition of this decimal zero condition for the count-down counter is provided by the combination of NOR gate 465 and inverter 466, which together function as a zero recognition circuit. The four inputs of NOR gate 465 are the "G" outputs of the four flip-flops. Therefore, the output of NOR gate 465 is a logic one, and the output lead 470 of inverter 466 is in logic zero if, and only if, all of the four input leads to NOR gate 465 are zero and therefore if, and only if, all of the four flip-flops are in logic state zero.

THE MULTIPLE TOOL OFFSET CORRECTION SYSTEM—IN DETAIL

Turning now to the detailed system, FIGS. 12 through 15 are taken together as shown in FIG. 16. In FIG. 12, offset sequencer 300 is shown within the broken line box and includes three major portions comprising tool offset read flip-flop 511, binary-coded-decimal sequence counter 513 which has four stages weighted 1–2–4–8, and a NOR gate logic array coupled to many of the $g$ and $h$ output leads of sequence counter 513. Tool offset read flip-flop 511 controls the operation of sequence counter 513. Input lead 305 of flip-flop 511 is, as was discussed in connection with FIG. 10, under control of the numerical program, and more particularly under the control of input numerical equipment 21 (see FIGS. 2A and 2B) or of a switch which may be utilized to introduce the tool offset. Flip-flop 511 has its $g$ and $h$ output leads applied as a closed loop back to the inputs in a manner such as shown in the basic flip-flop FIG. 4G. However, the set and reset trigger inputs are not tied to each other. The set trigger input is the aforementioned lead 305, while the reset trigger input is derived from the output zero recognition lead 306 of offset sequence counter 513. The zero recognition circuit was described previously in connection with FIG. 11.

The 511$h$ output lead of flip-flop 511 (which is always in opposite logic state from the state of the flip-flop itself) is applied as an input trigger lead to sequence counter 513. A second input to sequence counter 513 is a 250 pulses per second signal derived on lead 61 from the output of pulse rate divider 28. Accordingly, when flip-flop 511 has been set by a proper input signal on lead 305, sequence counter 513 commences counting down from its quiescent or decimal zero state until it once again reaches decimal zero. At that time, zero recognition output lead 306 applies a reset signal to the reset trigger input of flip-flop 511. With the reset signal from the zero recognition circuit applied, flip-flop 511 changes state and the enabling signal previously applied to the sequence counter on lead 511$h$ is removed. The sequence counter, therefore, under proper control from flip-flop 511, counts down through solely ten decimal steps at a rate of 250 counts per second, with the counting automatically terminated by the action of zero recognition output lead 306. This count-down controls the operation of the entire tool offset correction system. This is done through the output leads of the four stages 521, 522, 524 and 528, which are applied as inputs to the NOR gate array of offset sequencer 300.

Reference may profitably be had at this point to the timing diagram FIG. 17 which represents the waveforms of the logic signals on the output leads of the NOR gate array of sequencer 300. At various points in the description of the detailed circuitry of the offset correction system, reference will be made to these timing diagrams.

Waveform 611 represents the logic state on lead 61 applied as the clock pulse train $C_a$ to sequence counter 513 from the output of pulse rate divider 28. The frequency of $C_a$ is 250 cycles per second. Since the counting rate of sequence counter 513, when it is in operation, is 250 counts per second, each complete cycle of waveform 611 corresponds to the duration of one decimal state of sequence counter 513. Curve 612 of FIG. 17 depicts the logic state of offset read flip-flop 511. As shown, flip-flop 511 is set to the binary one state by an appropriate signal on input lead 305 shortly before the change in state from binary one to zero in curve 611. Accordingly, sequence counter 513 commences its count-down upon the application of a $C_a$ clock pulse, i.e., change from logic one to logic zero, as represented by point 613 on curve 611. Each full cycle of curve 611, thereafter corresponds to the duration of the period of a decimal digit state of sequence counter 513 as shown in line 615 of FIG. 17. For all succeeding curves in FIG. 17, therefore, reference may be had not only to time, but also to the decimal state of the sequence counter, thereby fixing the point in the offset correction sequence.

Returning to sequence counter 513 of FIG. 12, most of the $g$ and $h$ output leads of all four stages are applied down to the NOR gate array previously referred to as the third major portion of offset sequencer 300. Each of the output leads of sequence counter 513 (other than zero recognition output lead 515) is utilized in the NOR gate array to provide the sequence control required for the overall offset correction system.

There are seven output leads from offset sequencer 300. Leads 301, 302 and 303 support the signals TR1, TR2 and TR3, respectively, which interrogate switch array 309, and condition offset counter 321. Lead 324 also conditions offset counter 321 with signal TS. Leads 332, 333 and 334, utilized as inputs to logic block 331, support signals CT, RT and $\overline{RT}$, respectively. They, in combination with outputs from offset counter 321, provide the appropriate switching signals required for the implementation of the offset correction.

The output leads 333 (RT) and 334 ($\overline{RT}$) are nothing more than the 8 and $\overline{8}$ output leads from stage 528 of sequence counter 513. The other outputs are derived in a more complicated fashion. The derivation through the NOR gate array for these output leads will now be presented. Applied as inputs to NOR gate 531 are $\overline{1}$, 2 and 8 from the sequence counter. A fourth input lead is the clock pulse $C_b$ derived from one of the stages of the reference counter or pulse rate divider 28. More specifically, this lead is derived from the $h$ output lead of the second stage of the last or most significant decade of pulse rate divider 28. As shown in FIG. 12, pulse rate divider 28 divides the basic 250 kilocycle clock pulse by 1,000 through three decades. The first decade 541 has its four binary coded decimal stages weighted 1–2–4–8, while the succeeding two decades 542 and 543 have their stages weighted 1–2–4–5. The frequency output on the $h$ lead of the second stage of decade 543 is applied as the fourth input 545 of NOR gate 531. This frequency is shown graphically as curve 617 in FIG. 17. The output of NOR gate 531 is applied through inverter 533 such that the output TR3 thereof represents the following logic conditions:

$$\overline{(1 \cdot \overline{2} \cdot \overline{8} \cdot \overline{C_b})}$$

The logic state, therefore, of lead TR3 is completely defined by the output of the sequence counter and the timing pulses $C_b$ and is represented graphically as curve 633 of FIG. 17.

The TR2 output is derived from inputs 1, $\overline{2}$ and $C_b$ to NOR gate 535 and thence through inverter 537. Accordingly, the logic state of lead TR2 is defined in a logic sense by:

$$\overline{(\overline{1} \cdot 2 \cdot \overline{C_b})}$$

as shown in waveform 632. The TR1 and TS output signals are obtained as follows. Inputs $\overline{1}$, $\overline{2}$ and $C_b$ are applied to NOR gate 539 and thence through inverter 551. The output of inverter 551 is applied with the sub-clock $C_a$ to NOR gate 553 to obtain the TS output, while it is combined with $\overline{C_a}$ in NOR gate 554, and thence through inverter 555 to obtain the TR1 output. The TS and TR1 signals are shown as curves 635 and 636, respectively.

The CT output on lead 332 is derived in the following manner. The 1, 2 and $\overline{4}$ outputs from sequence counter 513 are applied as inputs to NOR gate 557, the output of which is applied as an input to the two input NOR gate 559. The second input to that NOR gate is the 8 output of the sequence counter. The output of NOR gate 559 is applied as an input steering signal to flip-flop 560, whose sole function is that of resynchronizing and reshaping the signal from NOR gate 559. Because of the many levels of logic, it is desirable at this point to retime the pulse which will be used as the CT signal on the output lead of resynchronizing flip-flop 560. The basic 250 kilocycle pulse rate is applied as the resynchronizing timing signal to flip-flop 560. The CT signal is represented by curve 621. The $C_c$ signal from pulse rate divider 28 is represented by curve 623.

The logic states of the four stages of offset counter 513 are represented in FIG. 17 by curves having the reference numerals 521, 522, 524 and 528, respectively. These are the same reference numerals as those used for the stages themselves in FIG. 12. Since the RT and $\overline{RT}$ signals are the same as the logic state of stage 528 and its inverse, the RT and stage 528 signals are represented by the same curve in FIG. 17. $\overline{RT}$, being the inverse of that curve, is not shown. Thus, in FIG. 17, the entire logic condition of the offset sequencer and its output leads are completely defined. Reference will be made both to the logic circuitry and to the curves in describing the operation of the tool offset correction system. In FIG. 17, curves 619, 623, 632 and 633 have some of their positive and negative excursions indicated by a broken line. This indicates that although the broken line is part of the curve, it does not perform any actual logic or switching function in the circuitry. In short, if the curves (i.e., the signals they represent) did not have the broken line portions, the utilization of these signals by the offset correction system would in no way be modified.

Figure 13:
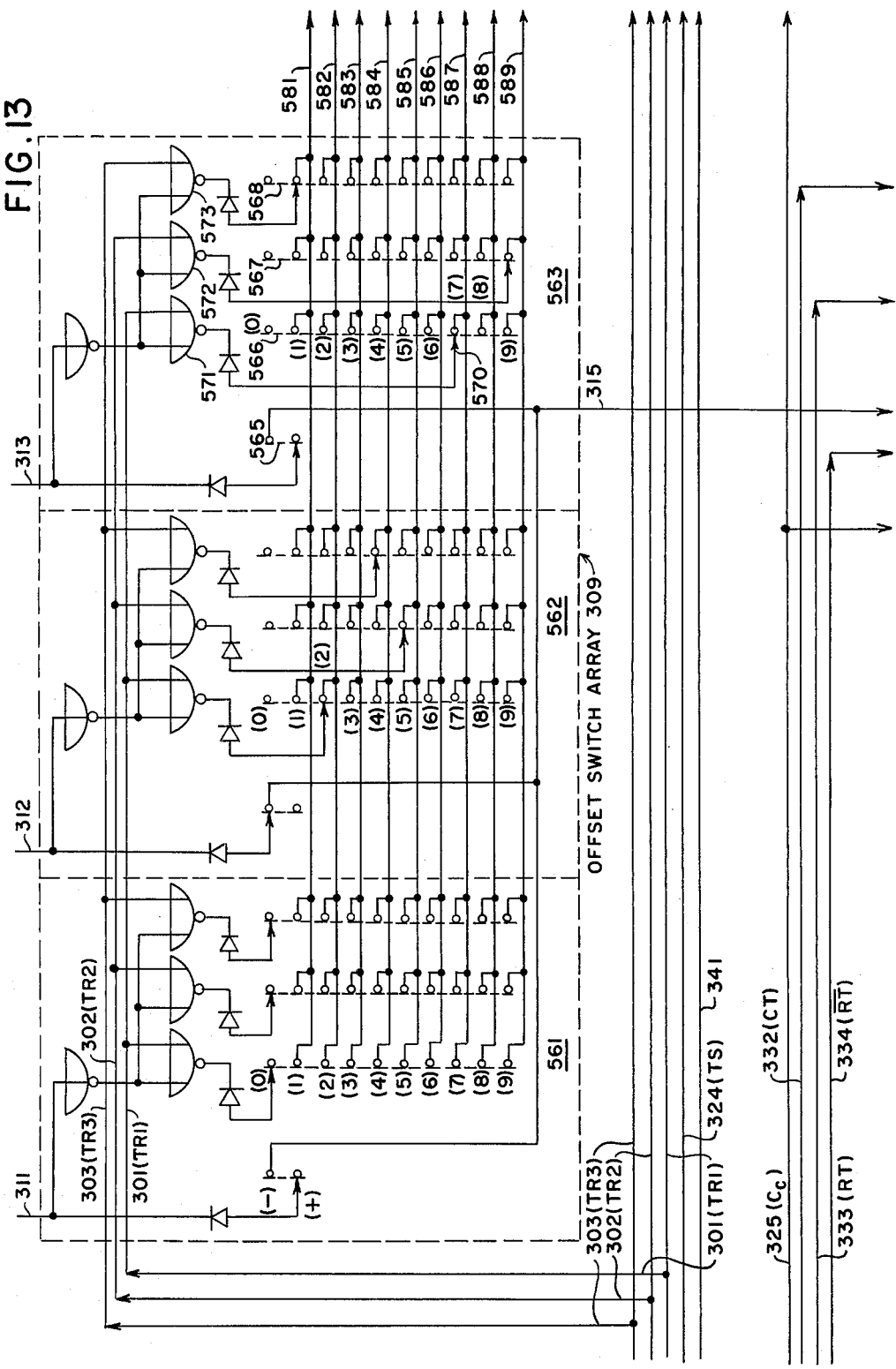

Turning now to the detailed circuit of tool offset decimal switch array 309 in FIG. 13, there is represented three sets of switches, 561, 562 and 563. Each set consists of three ten-contact switches and one two-contact switch. Physically, each of the ten-contact switches is mechanized by a ten-contact rotary switch, but is represented in the straight line form shown in the drawings for purposes of conserving space and ease in visualization of the switching and interrogation arrangement. The sets of switches 561, 562 and 563 are the mechanisms for setting up the Y coordinate tool offset correction in sign and magnitude for cutting tools 111, 112 and 113, respectively. Consider the set of switches 563 for the offset correction for cutting tool 113. As shown, switch set 563 has been set to provide the +791 offset correction previously discussed for this tool, by way of explanation relative to FIGS. 1E and 10. The four switches in set 563 are the two-contact sign switch 565, and the ten-contact decimal switches 566, 567 and 568. The switches proceed from left to right in decreasing order of decimal significance. As shown, the ten contacts of each switch are arranged to represent the digits zero through nine, from top to bottom. Accordingly, wiper 570 of switch 566 is shown in contact with the decimal digit 7 contact. Similarly, switches 567 and 568 are set so that their respective wipers are on decimal digits 9 and 1, respectively. The sign switch 565 having solely two contacts, is set with its wiper on the + contact. Each of the contacts of the four switches in this set has an output lead, except the digit zero contacts and the plus sign contact do not. The leads from these contacts are applied as inputs to decimal-to-binary coded decimal converter 317.

The Y offset correction for cutting tool 113 may readily be changed, both in sign and magnitude, by the operator in accordance with the technique for setting up and determining the offset correction discussed relative to FIGS. 1C through 1E. This is done merely by rotating the wipers of each of the four switches to whatever magnitude and sign offset correction may be desired or required.

In contrast with the offset setting of switch set 563, the switch set 561, corresponding to the reference tool 111 which has no offset correction introduced at all, is shown with the wipers all on the zero contacts of the switches. In this case, it is immaterial on which contact of the sign switch the wiper rests.

Means are provided to both interrogate switch sets 561, 562 and 563, and condition them for interrogation such that the switches are properly read in accordance with the requirements of the sequence set up by offset sequence counter 513. Each decimal switch in each set may have an input applied which produces an output to radix converter 317. However, only certain of the switches will have outputs which will be produced only during certain steps in the sequence.

Let us consider the switch set 563 as an example. There are three NOR gates, 571, 572 and 573, which apply inputs to switches 566, 567 and 568, respectively. To each of these NOR gates, there is applied as a first input the cutting tool 113 conditioning input lead 313, which carries signals indicating whether or not tool 113 has been called for by the program. If tool 113 has, in fact, been called for by the program, a binary zero signal is applied on input 313 to all three NOR gates. As a second input to the NOR gate 571, is lead 301 supporting the TR1 output from sequencer 300. This is the interrogation lead for the most significant digit switch in each of the three switch sets. As a second input for NOR gate 572 is the TR2 output, and as the second input for NOR gate 573 is the TR3 output.

The operation of switch set 563 may now be readily understood. With a logic zero applied to all of the NOR gates on input lead 313, the three decimal switches are conditioned for read out when interrogated by the sequential application of logic zero signals on the 301, 302 and 303 leads. Thus, when the TR1 signal is in logic state zero, NOR gate 571 has two zero inputs and therefore a logic one output. The logic one output is then routed appropriately through wiper 570 and the decimal 7 contact through output lead 587 to radix converter 317. At this time, the other two NOR gates 572 and 573 have solely one of their input leads in the zero state, while the other input leads for the TR2 and TR3 signals apply logic one signals to these NOR gates. Accordingly, the output of NOR gates 572 and 573, under this condition, is logic zero. Logic zero signals, however, cannot actuate radix converter 317. When, however, the next step in the sequence is called for, the TR1 lead reverts back to its logic one condition but the TR2 lead switches into its logic zero condition. Under these circumstances, it is the second switch, 567, which is interrogated, since NOR gate 572 has two logic zero inputs and consequently a logic one output. Similarly, during the next step of the sequence, solely TR3 is in its logic zero state, while TR1 and TR2 are in the logic one state. In this way, the three decimal switches 566, 567 and 568 are sensed by the TR1, TR2 and TR3 signals, respectively, in sequence, with the most significant switch being sensed first.

This entire interrogation process provides an output from switch set 563 only because input lead 313 for cutting tool 113 has been excited by the input numerical program due to the T3 instruction of the program. The other two switch sets 561 and 562, which have identical NOR gate control inputs to their respective demical switch sets are not read out during the time that switch set 563 is interrogated, because their input control leads 311 and 312 are not excited by the numerical program, i.e., neither tool 111 nor tool 112 is called for by the program at that time. Consequently, the 311 and 312 input leads are in logic state one, rather than logic state zero, and accordingly, each one of the NOR gate control inputs to the decimal switch sets 561 and 562 is disabled. When, however, a tool other than tool 113 is called for, the operation of interrogation and read out of switch sets 561 and 562 follows in exactly the same manner as that described for set 563.

The sign switch 565 in set 563 has an inverted input signal from that of lead 313. Accordingly, when input lead 313 supports a logic zero indicating that tool 113 is called for, the input lead to switch 565 is in logic state one and is applied to the plus contact. The convention adopted is that the plus contact be a blank output, and the minus contact connected to output signal lead 315. When the wiper of switch 565 is on the negative contact, the logic one signal is applied through output lead 315. The diode shown connected between the wipers of each switch and its NOR gate, is presented schematically merely to indicate that a short-circuit is prevented since the logic diagrams might be otherwise construed with the diodes absent. Since logic state one represents the more negative voltage of the two binary states, it follows that the diodes are properly poled for their function.

Output leads 581 through 589 from switch sets 561 through 563 are applied as input leads to radix converter 317. These leads correspond to the one through nine decimal digits which each switch may assume, other than the sign switches.

Figure 14:
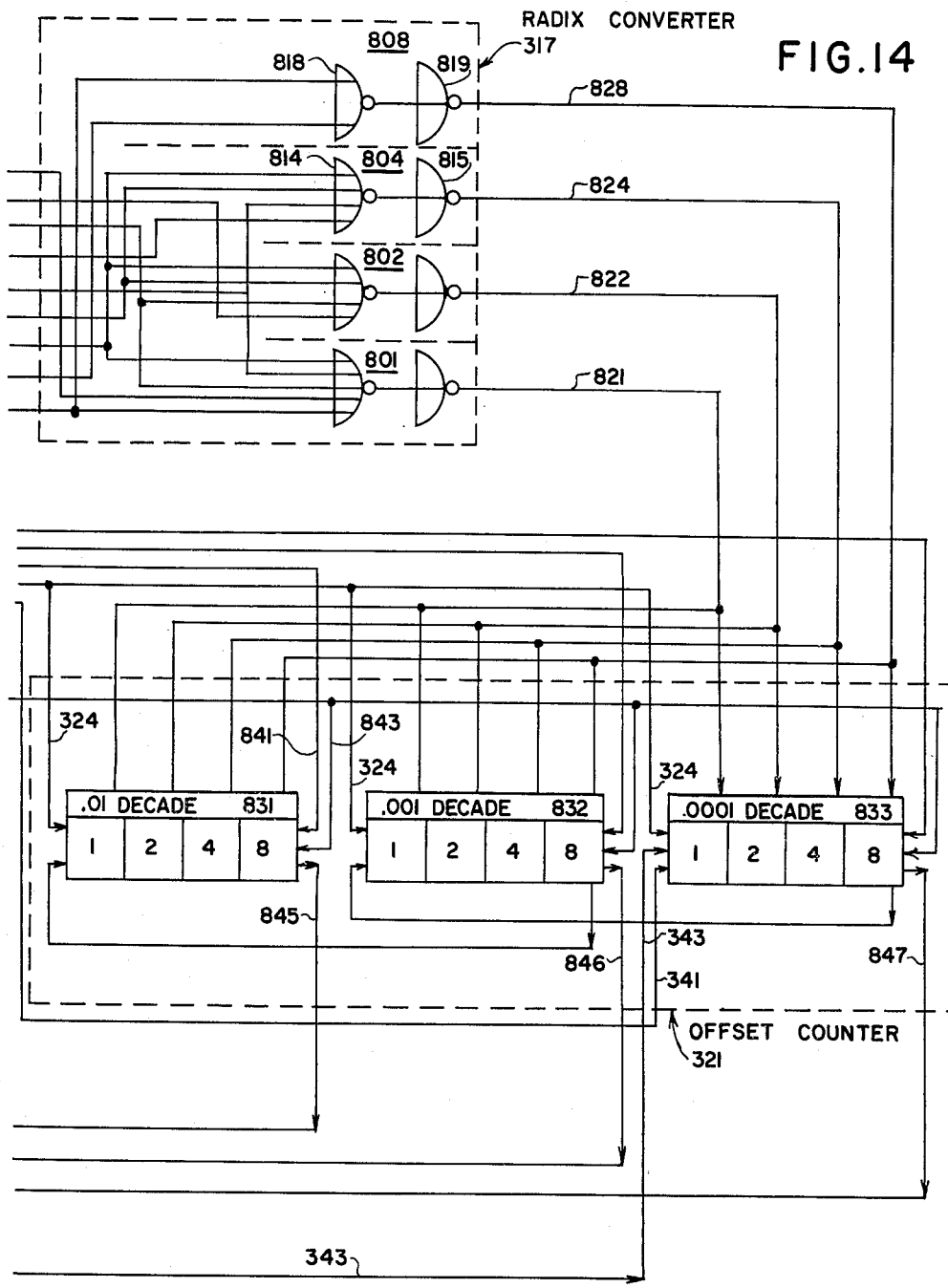

Radix converter 317 logic diagram is shown in FIG. 14. It comprises four sections 801, 802, 804 and 808. Each of the four sections of the radix converter is a stage in the binary-coded-decimal representation. Thus, the combination of the output leads 821, 822, 824 and 828 of the four sections represents a decimal digit in binary-coded-decimal notation. The output of the 808 stage has weight 8, of the 804 stage weight 4, the 802 stage weight 2, and of the 801 stage weight 1, in manner utilized previously as the weighting codes for many of the binary-coded-decimal decade counters heretofore discussed. Stage 808 has as its input leads 588 and 589, corresponding to decimal eight and nine signals, which are applied to NOR gate 818. NOR gate 818 is followed by an inverter 819. Therefore, the output lead 828 from stage 808 of the radix converter is in logic state one if, and only if, input leads 588 or 589, or both, are in logic state one.

These two leads are in logic state one only when one or more switches of the switch sets 561 through 563 has a wiper on the decimal eight contact or the decimal nine contact. It follows, therefore, that a logic one output from stage 808 on lead 828 occurs only if at least one of the tool offset decimal switches calls for a decimal eight or a decimal nine or a plurality of switches call for both. Stage 804 is arranged with NOR gate 814 followed by inverter 815 and output lead 824 in similar manner to stage 808. The inputs to NOR gate 814 are leads 584, 585, 586 and 587. Therefore, output 824 can be in logic state one only if one or more of the decimal four, five, six or seven contacts of the switch sets is contacted by a wiper. In similar fashion, the output leads 821 of stage 801 and 822 of stage 802 may have logic one outputs. Stage 801 has a logic one output if one or more of the switches calls for decimal one, three, five, seven or nine; while section 802 has a logic one output if one or more of the switches calls for decimal two, three, six or seven. Thus, if the switch under interrogation (such as, for example, switch 567 in set 563) has its wiper on the decimal 9 contact, a logic one is applied on lead 589 to both stages 801 and 808, and only to those stages. Accordingly, stages 801 and 802 will have outputs, i.e., logic ones on their output leads 821 and 828, respectively. Thus, the radix conversion is completed. Decimal 9 contact has been converted to the binary coded decimal representation (1001) in terms of the logic states of leads 821, 822, 824 and 828.

The output of radix converter 317 is applied to the presettable tool offset counter 321, which, as previously discussed, is a down counter. Since it is the function of decimal switches 561 through 563 to preset offset counter 321, the output signals from radix converter 317 are applied to the tool offset counter 321 for this purpose.

Offset counter 321 comprises decades 831, 832 and 833, which are arranged from left to right, respectively, in decreasing numerical significance. The 831 decade is for hundredths of an inch of offset correction, 832 for thousandths of an inch of offset correction, and 833 for ten-thousandths of an inch of offset correction. Each of the three decades is a count-down counter decade of the type described in connection with FIG. 11. Thus, the decades each have four stages weighted 1-2-4-8. Output lead 821 from stage 801 of radix converter 317 is applied to each of the weight one stages of the three decades; lead 822 is connected to each of the weight two stages; lead 824 to each of the weight four stages and lead 828 to each of the weight eight stages. The function of each of these leads is to change the logic state of the decade stages to which it is coupled from logic state one to logic state zero. During one step in the tool offset correction sequence, each stage in each decade is set to logic state one by signal TS on the set lead 324 to each of the three decades. (This corresponds to set lead 452 of FIG. 11 or the electronic set input E of FIG. 4H.) A binary-coded-decimal representation is preset in a decade by changing the appropriate stages of the decade from logic one to zero. The most significant decade 831 is thereby preset to represent the digit stored in the most significant decimal switch in the switch set for the cutting tool called for in the program.

The same interrogation signals which serve to read out the decimal switches, i.e., TR1, TR2, TR3, are utilized in the same sequential order to condition the three decades of the offset counter such that the digits in the switches are preset in the proper decades. In short, the TR1 signal is applied to switch array 309 and as a conditioning input signal to decade 831 on lead 841. As previously discussed with respect to the down counter decade of FIG. 11, this is the enabling input lead to the transfer gates and is comparable to transfer lead 557. At the same time, input lead 843 must also be in logic state zero in order for a number to be preset into the decade, i.e., in order for the appropriate stages of decade 831 to be switched from logic one to logic zero under the direction of radix converter 317. Lead 843 supports the $C_c$ sub-clock signal from pulse rate divided 28. The $C_c$ signal is represented as curve 623 in FIG. 17. Thus, only when a TR1 signal both interrogates switch array 309 and, at the same time, conditions decade 831 of the offset counter, can that decade be preset. The next step in the sequence is the application of the TR2 signal to switch array 309 and to decade 832 of the offset counter. Similarly, TR3 is subsequently utilized as a conditioning signal for the least significant digit decade 833.

All of the zero recognition output leads 845, 846 and 847 of the three decades are applied as inputs to logic block 331 in FIG. 15, and in particular, to NOR gate 848, the output of which is applied as an input in conjunction with the CT signal from offset sequencer 300 to NOR gate 849. Thus, NOR gate 848 functions as a master zero recognition gate for the entire offset counter. The output of NOR gate 848 can be in logic state one if, and only if, all three of input leads 845–847 are in logic state zero; in turn, this means the logic state one is achieved as an output for NOR gate 848 if, and only if, every stage of every decade in the offset counter is in logic state zero. Thus, a logic one is obtained out from NOR gate 848 solely under the condition that the offset counter registers decimal zero. However, the output of dual input NOR gate 849 is in logic state zero if either or both of two conditions obtain, i.e., if the offset counter registers decimal zero, or if the CT signal from offset sequencer 300 is in logic state one. The CT signal is a conditioning signal from the offset sequencer which insures operation of the offset counter and application of signals to be added or subtracted from the phase counter, only at the appropriate point in the sequence. Output lead 850 of NOR gate 849, therefore, carries one of the two major ultimate control signals in the offset correction system. The signal on lead 850 will be referred to as the first control signal, or CNTRL1.

The CNTRL1 signal is applied as an input to inverter 851, the output of which is applied as $\overline{\text{CNTRL1}}$ on lead 853. Lead 853 branches to the left, and to the right as lead 343. With lead 343 in logic state zero, the 250 kilocycles per second trigger input on lead 341 to decade 833 (FIG. 14) from clock 23 (FIG. 12) results in offset counter 321 counting down at that frequency. The manner in which the logic zero signal on lead 343 permits the counting down of a count-down decade was discussed with respect to FIG. 11.

In addition to controlling the count-down of the offset counter, the CNTRL1 and $\overline{\text{CNTRL1}}$ signals are utilized in logic block 331 to derive the second and last major control signal CNTRL2. The combination of CNTRL1 and CNTRL2 controls the application of input pulses to the command phase counter in accordance with the tool offset correction requirements.

As will be seen from the circuitry, the CNTRL1 signal must be in the logic one state in order for command phase counter 31 to operate in its add or subtract mode (this is also a requirement for offset counter 321 to count down, as previously shown). The CNTRL2 signal, used in conjunction with the CNTRL1 signal, on the other hand, determines whether the non-normal count in the command phase counter is to be additive or subtractive. Thus, if the non-normal count in the variable rate command phase counter is to be for a positive offset direction, requiring a count-by-two and an increase in the phase angle output, then CNTRL2 must be in logic state one, while if it is to be in a negative direction, then CNTRL2 must be in logic state zero.

Command phase counter 31 of FIG. 15 is identical to that of FIG. 5 as further explained by FIGS. 6 and 9, with, however, the addition of logic circuitry which permits the application of CNTRL1 and CNTRL2 to the two control inputs of the command phase counter. In FIG. 5, input control leads 777 and 778 were shown. They are also shown in FIG. 15 with input leads 877 upon which signal CNTRL1 is applied, combined with input lead 777, while input lead 878 upon which signal CNTRL2 is applied, is combined with input lead 778.

Leads 777 and 877 are applied as inputs to NOR gate 881 and thence to inverter 883 whose output is lead 777'. Input lead 778 is applied to an inverter 885; the output of this inverter is applied as an input along with lead 878 to NOR gate 887, the output of which is lead 778'.

It may be recalled that it is a requirement of the offset correction system that when contouring takes place, offset correction may not be introduced, and conversely, when an offset correction is being introduced, contouring may not occur. Thus, when leads 777 and 778 (which are the leads controlling the operation of the command phase counter during the contouring operation, as described and defined explicity in connection with FIG. 5) control the operation of the command phase counter, leads 877 and 878 (which are restricted to controlling the command phase counter solely for offset correction) impose no constraints upon the operation of the command phase counter. Conversely, when offset correction is required and leads 877 and 878 are in fact controlling the operation of the command phase counter, then the contouring leads 777 and 778 place no constraint whatsoever upon the command phase counter.

The circuitry defined, therefore, by the NOR gates 881, 883, 885 and 887 in conjunction with their input and output leads perform this unique function and requirement. Under the condition, then, that offset correction is not in progress, lead 777 is always in the same logic state as lead 777' and lead 778 is always in the same logic state as lead 778'. Therefore, the description of the operation of the command phase counter with respect to FIG. 5 is identical to that shown in FIG. 15 and the logic states for leads 777 and 777' may be interchanged at will, while the logic states for leads 778 and 778' may be interchanged at will. It may be recalled that the truth table for the normal or count-by-one mode, the add or count-by-two mode, and the subtract or count-by-zero mode is as follows:

TABLE 3

| Type of Count | Lead 777 | Lead 777' | Lead 778 | Lead 778' |
|---|---|---|---|---|
| Normal—Count-by-one | 0 | 0 | 1 | 1 |
| Add—Count-by-two Positive Dir. | 1 | 1 | 0 | 0 |
| Subtract—Count-by-zero Negative Dir. | 1 | 1 | 1 | 1 |

Thus, in order to have either of the non-normal counts, lead 777 must be in logic state one; in order to advance the phase lead 778 must be in logic state zero, while lead 778 must be in logic state one in order to retard the phase.

Leads 777' and 778' are in the condition to provide this type of operation when CNTRL1 and CNTRL2 are both in their logic zero states. When this happens, then the contouring control leads 777 and 778 control the operation of the command phase counter. On the other hand, when leads 777 and 778 are in their logic zero and one states, respectively, then a normal count is required as far as contouring is concerned. Under these circumstances, then, CNTRL1 and CNTRL2 can control the operation of the command phase counter to introduce whatever offset correction may be required. More specifically, Table 4 below indicates the logic states of the leads 877 and 878, which will introduce a phase change to provide the offset correction.

TABLE 4

| Type of Count | Lead 877 (CNTRL 1) | Lead 878 (CNTRL 2) | Lead 777' | Lead 778' |
| --- | --- | --- | --- | --- |
| Normal—Count-by-one | 0 | 0 | 0 | 1 |
| Add—Count-by-two Positive Dir. | 1 | 1 | 1 | 0 |
| Subtract—Count-by-zero Negative Dir. | 1 | 0 | 1 | 1 |

Thus, to have either of the non-normal counts in the command phase counter for offset correction purposes, lead 877 (CNTRL1) must be in logic state one; in order to advance the phase, lead 878 (CNTRL2) must be at logic state one, while the phase is retarded when it is in logic zero. In short, the logic state of CNTRL2 determines whether the offset correction is to be superposed upon the phase output of the command phase counter in a positive or negative sense. In the process of adding or subtracting an offset correction, not only must it be known whether the input tape requires a positive or negative offset correction, but also whether the offset sequence is at that step which requires removing the old offset correction rather than applying the new offset correction. The logic circuitry now to be described demonstrates that the CNTRL2 signal which determines the sense of the superposed signal on the command phase counter output incorporates both of these factors, i.e., the programmed direction of the offset correction, and whether the offset correction stored in the offset counter is to be imposed upon or removed from the command phase counter output.

Output lead 315 of decimal switch array 309 (FIG. 13) which is the direction or sign lead, is applied to logic block 331 (FIG. 15) at inverter 901. Lead 315 is in logic state one when a negative direction for the offset is required and is in logic state zero when a positive direction is required. The output of inverter 901 is in turn applied as the set steering input lead 903a of offset sign flip-flop 903. Lead 315 is also applied directly as the reset steering lead input to flip-flop 903. Accordingly, when set steering lead 903a is in logic state zero and a pulse is applied to the input trigger leads 903c–d, tool offset sign flip-flop 903 is set to its logic one state. Thus, when flip-flop 903 is in its logic one state, a negative or minus direction offset correction has been required by the appropriate sign switch in array 309 if the sequence at that point involves putting in a new offset correction, while it means that a negative direction offset correction has already been introduced into the system if the sequence is past the point of having superposed the offset correction on the system. Trigger input leads 903c–d are derived from the output of inverter 905, whose input is the TS signal from offset sequencer 300. The TS signal, elsewhere, resets all the decades of offset counter 321 to prepare it for presetting. Reference to curve 635 of timing diagram FIG. 17 shows this.

The 903g output lead of flip-flop 903 is applied as an input with the $\overline{\text{RT}}$ signal from sequencer 300 to NOR 907, while the h output lead is applied with RT to NOR 909. It may be recalled that the RT signal is derived from the output of stage 528 of sequence counter 513 and therefore RT and $\overline{\text{RT}}$ reflect whether or not the offset sequence counter is in its decimal eight or nine condition. The outputs of NOR gates 907 and 909 are applied with $\overline{\text{CNTRL1}}$ from inverter 851 to the three-input NOR gate 911. The output of NOR gate 911 is lead 878, carrying the CNTRL2 signal. This signal is, of course, applied to the command phase counter through NOR gate 778' as discussed previously. Reference to Table 4 demonstrates that when CNTRL2, in accordance with the previous discussion, is in logic state one, the command phase counter will count by two (assuming CNTRL1 is also in logic state one), while it will subtract or count by zero when CNTRL2 is in logic state zero.

The logic circuit comprising NOR gates 907, 909 and 911 operates, therefore, such that although flip-flop 903 may call for a negative direction, the command phase counter is constrained to introduce a positive direction change in its output when offset sequence counter 513 is in its decimal eight or nine count, by virtue of the application of the RT and $\overline{\text{RT}}$ signals to NOR gates 907 and 909. The reason for this is simply that when the sequence counter is in its decimal eight or decimal nine count, the offset correction system is in the process of removing the previously introduced offset correction. In order to remove the offset correction, the phase change introduced in the output of the command phase counter must be the opposite of the sense of the phase change that was provided when the previous offset correction was first introduced, and the state of offset sign flip-flop 903 indicates the sign of the offset correction already introduced and now to be removed. When the sequence counter is at any count other than decimal eight or decimal nine, any change introduced in the output of the command phase counter will be in the same sense as the sign registered in offset sign flip-flop 903.

The detailed logic circuitry of FIGS. 12 through 15, taken together as shown in FIG. 16, and the timing diagram of FIG. 17, with the structural and operational description thereof presented above, completely define the preferred embodiment of a tool offset correction system in accordance with the principles of the invention. Recapitulation wlil now be provided by tracing through, with special reference to FIGS. 12 through 15, one specific example of automatic change in tool offset correction.

Assume a minus .0254 of an inch offset correction is already in the system, i.e., the output of the command phase counter has had its phase angle retarded .254 of a cycle. Such a correction is appropriate for the cutting tool 112 of FIG. 1D, as set up in switch set 562 of array 309 of FIG. 13. Assume that the new offset correction is to be plus .0791 of an inch as for cutting tool 113 and switch set 563.

The offset system of FIGS. 12–15, therefore, has certain specific initial conditions reflected in the states of various portions thereof. At the beginning of the operation, sequence counter 513 is in its decimal zero count with each one of stages 521, 522, 524 and 528 registering logic state zero. Tool offset sign flip-flop 903 is in logic state one, indicating a minus sign for the offset correction presently in the system. Offset counter 321 has its decades 831, 832 and 833 registering the old offset correction 254 with the most significant decade 831 representing decimal digit two, decade 832 representing five, and decade 833 representing four.

The entire offset correction change is initiated by a start signal on lead 305 to offset read flip-flop 511, while at the same time a signal calling for a positive offset correction and cutting tool 113 is applied on input lead 313 to switch set 563 of switch array 309. When the start signal is applied to offset read flip-flop 511, output 511h changes state and initiates the count-down of sequence counter 513. Counter 513 counts, in its first step, down to decimal nine. Reference to curve 615 of FIG. 17 shows the states for all of the output signals from sequencer 300 during the decimal nine count of counter 513. The state of offset read flip-flop 511 as shown by curve 612 remains in its logic one state until the sequence counter counts down to zero. Therefore, it is the sub-clock signal $C_a$ as presented in curve 611 that is responsible for counting off the ten decimal steps of the sequenc counter. When the first cycle of $C_a$ is completed, counter 513 counts down to the next step, decimal eight. Review of the curves of FIG. 17 and the circuitry of FIGS. 15 and 14 demonstrates that during the decimal nine and eight counts of sequence counter $\overline{\text{CNTRL1}}$ functions on input lead 343 to offset counter 321 to count it down from 254 to 0. At the same time, it is being applied with CNTRL2 to the logic circuitry immediately preceding command phase counter 31 to provide a non-normal count in the command phase counter. In particular, the count is for the positive direction despite the fact that tool offset sign flip-flop 903 registers logic one and therefore an indication that the presently superposed offset is a negative offset, since this offset must now be removed. By the time the next cycle of $C_a$ is reached, offset counter 321 has counted down from 254 to zero, and the command phase counter has provided a double count for 254 clock pulses, which clock pulses are at the same frequency as those counting down the offset counter (i.e., 250 kilocycles per second). By the end of decimal state eight in the offset sequencer, therefore, the old offset correction has been removed from the phase modulated output of the command phase counter, and the offset counter has been counted down to logic state zero. With the third cycle of $C_a$, the sequence counter is in its decimal seven count.

During this step, the TS signal (curve 635) is applied to each of the three decades of offset counter 321 so as to set each stage of each decade to logic state one. Subsequent thereto, but within the decimal seven count of the sequencer counter, the TR1 signal is applied from sequencer 300 to interrogate the most significant decimal switch 566 of switch set 563 and at the same time condition the most significant decade 831 of offset counter 321 to receive the most significant digit. Through the action of radix converter 317, the decimal eight stage of the decade 831 is changed from its logic one state to logic zero state. Thereby, decade 831 registers, or is preset to decimal 7, since all the other stages of that decade remain in their logic one condition from the time that they were set.

When sequence counter 513 counts down to its decimal six count, the TR2 signal comes into play and in the same fashion as did TR1. The second most significant decimal switch 567 is interrogated and decade 832 of the offset counter is preset to decimal 9. During decimal 5 count of the sequence counter, the TR3 signal comes into play and the least significant decade 833 is preset to decimal 1.

The decimal 4 count of the sequence counter is the one wherein the newly introduced offset number in offset counter 321 is counted down to zero and command phase counter 31 appropriately has the new offset number applied to it in a manner to phase modulate its output. This is done in exactly the same way that the old offset correction signal was counted down in the offset counter and removed from the phase modulated output of the command phase counter during the decimal nine and eight counts of the sequencer, with the sole exception that the sign set in the tool offset sign flip-flop 903 is utilized in a different way. Because of the action of NOR gates 907, 909 and 911, the sign set into the flip-flop 903 is the direction for the correction that is actually used in the command phase counter. Thus, in this instance, the sign set in flip-flop 903 is a positive sign (logic state zero) since sign switch 565 of set 563 is on the plus contact, and 791 pulses are double-counted in command phase counter 31. At the end of the decimal 4 count of sequence counter 513, therefore, the offset counter 321 has counted down from 791 to zero and the output phase of command phase counter 31 has been advanced by .791 of a cycle.

The remaining sequence of steps merely restores the plus 791 offset number back into offset counter 321, so that when the next offset correction is called for, this correction may be removed from the output of the command phase counter in which it now resides as a leading phase angle. This is accomplished during the decimal three, two and one counts of sequence counter 513 in exactly the same manner as was accomplished during the decimal 7, 6 and 5 counts.

At the end of the sequence counter's decimal one count, the transition of the sequence counter is then to its quiescent or decimal zero count. When this happens, zero recognition output lead 306 applies its stop signal to offset read flip-flop 511 as shown in curve 641 of FIG. 17. Thus, the change from logic state one to zero of waveform 641 is produced by the transition from decimal one to decimal zero of the sequence counter. Flip-flop 511 remains in this condition, as does the sequence counter, until the next time a start signal is applied on its input lead 305. At this time, then, the offset correction for cutting tool 113 has been applied to the feed mechanism applying crossfeed for the turret tool post.

While the principles of the invention have now been made clear in the illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed as new and desired to be secured by Letters Patent of the United States is:

1. Automatic control apparatus for machine tools, comprising: transducer means for translating a control signal in the form of the frequency of a pulse train into an output utilization signal in a form defined by a characteristic other than pulse frequency; first control means coupled to the input of said transducer means for partially determining and controlling the magnitude of said other characteristic of said output utilization signal; second control means coupled to the input of said transducer means for partially determining and controlling the magnitude of said other characteristic of said output utilization signal; said second control means including means for registering for subsequent use that part of the change in magnitude of said other characteristic in said output utilization signal determined by said second control means.

2. Automatic control apparatus for machine tools, comprising: transducer means for translating a control signal in the form of the frequency of a pulse train into an output utilization signal in a form defined by a characteristic other than pulse frequency; first control means coupled to the input of said transducer means for partially determining and controlling the magnitude of said other characteristic of said output utilization signal; second control means coupled to the input of said transducer means for partially determining and controlling the magnitude of said other characteristic of said output utilization signal; said second control means including means for registering for subsequent use that part of the change in magnitude of said other characteristic in said output utilization signal determined by said second control means; said second control means also including means for registering the algebraic sense of said change in magnitude determined by said second control means and for constraining said transducer means, when under the control of said second control means, to impose a change in magnitude of said other characteristic of said output signal of algebraic sense opposite to that last imposed under the constraint of said second control means at least once for any two successive changes in said output signal magnitude due to said second control means, irrespective of the sense of the registration in said algebraic sense registering means.

3. An automatic numerical machine tool control system, comprising: transducer means for translating a control signal in the form of the pulse rate of a pulse train into an output utilization signal in a form defined by a characteristic other than pulse rate; a numerical machine tool path determining means coupled to the input of said transducer means for superposing a change in magnitude of said other characteristic in a positive or negative sense upon said output signal; a tool offset correction means coupled to the input of said transducer means for superposing a change in magnitude of said other characteristic in a positive or negative sense upon said output signal; said tool offset correction means including means for storing for future use the magnitude and sense of said change of said other characteristic superposed upon said output signal by said offset correction means.

4. An automatic numerical machine tool control system, comprising: transducer means for translating a control signal in the form of the pulse rate of a pulse train into an output utilization signal in a form defined by a characteristic other than pulse rate; a numerical machine tool path determining means coupled to the input of said transducer means for superposing a change in magnitude of said other characteristic in a positive or negative sense upon said output signal; a tool offset correction means coupled to the input of said transducer means for superposing a change in magnitude of said other characteristic in a positive or negative sense upon said output signal; said tool offset correction means including means for storing for future use the magnitude and sense of said change of said other characteristic superposed upon said output signal by said offset correction means; said offset correction means also including means for removing any change superposed upon said output signal by said offset correction means before any new tool offset correction change may be superposed upon said output signal by superposing a signal upon said transducer output signal equal in magnitude to, and opposite in sense from, said magnitude and sense stored in said storing means.

5. An automatic numerical machine tool control system comprising: transducer means for providing a phase modulated pulse train output; first means coupled to said transducer means for phase modulating said output; second means coupled to said transducer means for phase modulating said output irrespective of any phase modulation previously done by said first means; and means included within said second means for insuring that at least one of any two successive changes in phase modulation by said second means is equal in magnitude but opposite in sense to the immediately preceding change in phase modulation by said second means.

6. In a numerical contouring control system for automatic machine tool control, apparatus comprising: a variable rate pulse counting means for providing a phase modulated output pulse train as a function of a plurality of inputs; contouring control means coupled to an input of said variable rate means for superposing a phase change upon said output train commensurate in magnitude and sign with a component of desired velocity of travel for said machine tool; tool offset correction means coupled to an input of said variable rate means for superposing a phase change upon said output train commensurate in magnitude and sign with a component of required tool offset correction distance; said offset correction means including means for storing for future use a number and sign commensurate with the magnitude and sign of the component of offset correction distance currently superposed by phase modulation upon said variable rate counter output.

7. Apparatus as recited in claim 6 including recognition means coupled to the output of said storing means for ascertaining and signaling the completion of said superposed phase change commensurate with said component of required tool offset correction distance; and logic means coupled to an input of said variable rate means and responsive to said recognition means for precluding any further phase change in the output of said variable rate means due to said offset correction means while said recognition means signals said completion of said phase change.

8. Apparatus as recited in claim 6, wherein said offset correction means includes means for superposing a phase change upon said output train commensurate in magnitude with said number in said storing means but opposite in sense to said sign in said storing means.

9. In a numerical contouring control system for automatic machine tool operation wherein each pulse in said system is equivalent to an increment of distance to be moved by said tool, the combination comprising: a pulse clock; a variable rate counter whose normal counting rate is the same as said clock's frequency and whose output pulses are phase modulated as a function of said variable counter's counting rate; a tool offset correction system coupled to the input of said variable rate counter to phase modulate said counter's output to be utilized for automatically bringing the cutting edge of said machine tool into register with a cutting reference point; said offset correction system including a plurality of sets of manual multi-contact switches for numerically representing the magnitude and direction of a plurality of required tool offset corrections; an offset correction counting means selectively responsive to said sets of switches for counting out a number of pulses from said clock equal to a number represented in one of said sets of switches; logic block control means coupled to an output and an input of said offset correction counting means and to an input of said variable rate counter for constraining said counter to simultaneously count the pulses counted by said offset correction counter at a rate other than said normal counting rate of said variable rate counter; and a tool offset sequencer having outputs coupled to said sets of switches, said offset correction counter and to said logic block means for constraining said offset correction counter to count a number of pulses equal to the number in only a preselected one of said sets of switches and for controlling at which of said non-normal rates said variable rate counter counts under the intermediary control of said logic block means.

10. Apparatus as recited in claim 9 wherein each of said multi-contact switches is adapted to represent a decimal digit, said offset correction counting means is a binary-coded decimal down counter; and a radix converter disposed between said sets of switches and said down counter for converting said decimal digit representation to binary-coded decimal form.

11. Apparatus as recited in claim 9 wherein said tool offset sequencer includes a count-down decade counting means for counting out steps in the sequence controlling the operation of said offset correction counting means and said logic block control means, said decade counting means including means for recognizing when said decade counting means register a decimal zero, and a flip-flop responsive to said recognizing means and coupled to the input of said decade counting means for halting the operation of said decade counting means when said decade changes count from decimal one to decimal zero.

12. Apparatus as recited in claim 10 including means for registering in said offset correction counter a numerical representation equal to that registered in a preselected one of said switch sets, said registering means comprising means responsive to said sequencer for setting each stage of said offset correction counter to binary one, and means responsive to said sequencer for interrogating said switch sets and conditioning said offset counter to change selected ones of its stages from binary one to binary zero to provide a binary-coded representation compatible with the output of said radix converter.

13. Apparatus as recited in claim 12 wherein said logic block control means includes circuit means responsive to outputs of said offset correction counter for ascertaining when said offset correction counter registers decimal zero, and for precluding said variable rate counter during said decimal zero registration of said offset counter from counting other than in its normal mode responsive to said tool offset correction system.

14. Apparatus as recited in claim 9 wherein each of said sets of manual switches includes a two position sign switch for representing the direction of the offset correction the magnitude of which is represented by the multi-contact switches of its set; said sign switch being connected to said logic block control means to constrain said variable rate counter to count at a non-normal rate dependent during certain intervals upon the state of said sign switch.

15. Apparatus as recited in claim 14 including means within said logic block means for constraining said variable rate counter to count at a non-normal rate dependent during intervals other than said certain intervals upon the inverse of the state of said sign switch.

References Cited by the Examiner

UNITED STATES PATENTS

| | | | |
|---|---|---|---|
| 2,537,770 | 1/51 | Livingston | 340—172.5 |
| 2,886,506 | 12/58 | Hurath | 340—172.5 |
| 2,922,940 | 1/60 | Mergler | 340—347 |

ROBERT C. BAILEY, *Primary Examiner.*